(12) United States Patent
Schiavone et al.

(10) Patent No.: US 12,222,298 B2
(45) Date of Patent: Feb. 11, 2025

(54) MULTI-SENSOR PIPE INSPECTION SYSTEM AND METHOD

(71) Applicant: Hydromax USA, LLC, Evansville, IN (US)

(72) Inventors: Guy Schiavone, Satellite Beach, FL (US); Adam Fredrick Stewart, Louisville, KY (US)

(73) Assignee: Hydromax USA, LLC, Evansville, IN (US)

( * ) Notice: Subject to any disclaimer, the term of this patent is extended or adjusted under 35 U.S.C. 154(b) by 112 days.

(21) Appl. No.: 17/992,567

(22) Filed: Nov. 22, 2022

(65) Prior Publication Data

US 2023/0077875 A1     Mar. 16, 2023

Related U.S. Application Data

(63) Continuation of application No. 16/402,832, filed on May 3, 2019, now Pat. No. 11,598,728.
(Continued)

(51) Int. Cl.
*G01N 21/954*    (2006.01)
*E21B 47/002*    (2012.01)
(Continued)

(52) U.S. Cl.
CPC ......... *G01N 21/954* (2013.01); *E21B 47/002* (2020.05); *G01M 3/005* (2013.01);
(Continued)

(58) Field of Classification Search
CPC ............. G01N 21/954; G01N 21/8803; G01N 21/8851; G01N 2021/8874;
(Continued)

(56) References Cited

U.S. PATENT DOCUMENTS

| | | | |
|---|---|---|---|
| 4,920,655 | A | 5/1990 | Van Steenwyk |
| 5,527,003 | A | 6/1996 | Diesel et al. |

(Continued)

FOREIGN PATENT DOCUMENTS

| | | |
|---|---|---|
| CH | 720477 | 8/2024 |
| CN | 101354757 | 1/2009 |

(Continued)

OTHER PUBLICATIONS

Li et al., "On Optimizing Autonomous Pipeline Inspection", IEEE Transactions on Robotics, vol. 28, No. 1, Feb. 2012.
(Continued)

*Primary Examiner* — Mohamed Charioui
*Assistant Examiner* — Lynda Dinh
(74) *Attorney, Agent, or Firm* — Sand, Sebolt & Wernow Co., LPA

(57) ABSTRACT

An approach for collecting disparate data within a pipe involves a sensor arrangement configured to be deployed within the pipe. The sensor arrangement includes a plurality of sensors configured to detect disparate data related to the pipe. Each sensor of the plurality of sensors is coupled to a respective collection computer on the sensor arrangement. A synchronization module is configured to synchronize the disparate data. A database is configured to store the synchronized data. A processor is configured to process the synchronized data. A user interface configured to present the synchronized data to a user.

15 Claims, 29 Drawing Sheets

Related U.S. Application Data

(60) Provisional application No. 62/667,267, filed on May 4, 2018.

(51) Int. Cl.
  *G01M 3/00* (2006.01)
  *G01M 3/38* (2006.01)
  *G01N 21/88* (2006.01)
  *G06T 11/00* (2006.01)
  *H04N 7/18* (2006.01)

(52) U.S. Cl.
  CPC .............. *G01M 3/007* (2013.01); *G01M 3/38* (2013.01); *G01N 21/8803* (2013.01); *G01N 21/8851* (2013.01); *G06T 11/00* (2013.01); *H04N 7/181* (2013.01); *G01N 2021/8874* (2013.01); *G01N 2021/888* (2013.01); *G01N 2021/8893* (2013.01)

(58) Field of Classification Search
  CPC ...... G01N 2021/888; G01N 2021/8893; E21B 47/002; G01M 3/005; G01M 3/007; G01M 3/38; G06T 11/00; H04N 7/181
  See application file for complete search history.

(56) References Cited

U.S. PATENT DOCUMENTS

| | | | |
|---|---|---|---|
| 5,574,649 | A | 11/1996 | Levy |
| 6,151,961 | A | 11/2000 | Huber et al. |
| 6,333,699 | B1 | 12/2001 | Zierolf |
| 6,543,280 | B2 | 4/2003 | Duhon |
| 6,668,465 | B2 | 12/2003 | Noureldin et al. |
| 7,216,055 | B1 | 5/2007 | Horton et al. |
| 7,350,410 | B2 | 4/2008 | Ekseth et al. |
| 7,411,196 | B2 | 8/2008 | Kalayeh |
| 7,830,273 | B2 | 11/2010 | Twitchell |
| 8,024,066 | B2 | 9/2011 | Reverte et al. |
| 8,041,517 | B2 | 10/2011 | Thayer et al. |
| 8,977,521 | B2 * | 3/2015 | Angevine ............... G06F 30/00 703/1 |
| 9,151,837 | B2 | 10/2015 | Jaganthan et al. |
| 9,183,527 | B1 | 11/2015 | Close et al. |
| 9,219,886 | B2 | 12/2015 | Sooy et al. |
| 9,285,290 | B2 | 3/2016 | Chatzigeorgiou |
| 9,835,564 | B2 | 12/2017 | Olsson |
| 11,906,989 | B2 | 2/2024 | Lendi |
| 2002/0143491 | A1 | 10/2002 | Scherzinger |
| 2011/0261649 | A1 | 10/2011 | Wallbom et al. |
| 2012/0069172 | A1 | 3/2012 | Hudritsch |
| 2012/0134140 | A1 * | 5/2012 | Keatch .................... G01N 1/08 362/101 |
| 2014/0232932 | A1 | 8/2014 | LiKamWa |
| 2015/0154522 | A1 | 6/2015 | Mircean et al. |
| 2015/0355045 | A1 | 12/2015 | Solomon |
| 2016/0103433 | A1 | 4/2016 | Sahni et al. |
| 2016/0104071 | A1 | 4/2016 | Brueckner |
| 2016/0283915 | A1 | 9/2016 | Aggarwal et al. |
| 2016/0356666 | A1 | 12/2016 | Bilal et al. |
| 2017/0045416 | A1 * | 2/2017 | Hansen .................... G01M 3/18 |
| 2017/0126995 | A1 | 5/2017 | Stein |
| 2017/0191361 | A1 * | 7/2017 | Khalaj Amineh ....... G01V 3/38 |
| 2017/0261469 | A1 * | 9/2017 | Chang ................... E21B 47/006 |
| 2018/0171774 | A1 | 6/2018 | Ringer et al. |
| 2018/0264556 | A1 * | 9/2018 | Silveira E Silva .. G01N 21/954 |
| 2018/0306374 | A1 * | 10/2018 | Barnes .................... B29C 65/34 |
| 2018/0349817 | A1 | 12/2018 | Goel et al. |

FOREIGN PATENT DOCUMENTS

| | | |
|---|---|---|
| CN | 101354757 A | 1/2009 |
| CN | 102506737 | 7/2014 |
| DE | 102010022608 | 12/2011 |
| DE | 102023131403 | 8/2024 |
| JP | H05-143733 A * | 6/1993 |
| JP | 2002-5893 A * | 1/2002 |
| WO | 199503526 | 2/1995 |

OTHER PUBLICATIONS

Detect Pipes Sensors Camera Disposed Locations in Pipe—Google Scholar, Feb. 3, 2022.
https://iq.ip.com/discover, Feb. 2, 2022.
RedZone Robotics, MSI Sample Specifications—MSI v1.0, "Multiple Sensor Inspection (MSI) for Large Diameter Municipal Pipelines".
Oliphant, K. (May 21, 2015 ). Modeling Cross Bore Risk [Conference Presentation]. AGA 2015 Operations Conference & Biennial Exhibition, Grapevine, TX, United States.
Azari, P., & Karimi, M. (2017). Quantitative Risk Mapping of Urban Gas Pipelinenetworks Using GIS. ISPRS—International Archives of the Photogrammetry, Remote Sensing and Spatial Information Sciences, 319-324.
D'Atri, M.F., Rodriguez, D., & Garcia-Martinez, R. (2009). Improving Pipeline Risk Models by Using Data Mi Ni Ng Techniques. http://members.igu.org/html/wgc2009/papers/docs/wgcFinal00663.pdf.
Third Party Submission (TPS1) into unrelated U.S. Appl. No. 18/163,642, TPS1 filed on Dec. 8, 2023 by Elaine Johnson.
Third Party Submission (TPS2) into unrelated U.S. Appl. No. 18/163,662, TPS1 filed on Dec. 8, 2023 by Elaine Johnson.
Tony Sileo (moderator), "Risk Model for Cross-Boring," Slideplayer.com, 2016 [online] Retrieved on Sep. 9, 2024 from the Internet: <URL: slideplayer.com/slide/13176092/> (17 pages).
Shittu Whanda et al., "Modelling of Potential Pipeline Impact Radius and High Consequence Area in a Wetland Sub-Region of Nigeria," Journal of Geographic Information System, 2015, 7, 692-709 (published online Dec. 2015 in SciRes). Retrieved on Sep. 9, 2024 from the Internet: <URL: http://dx.doi.org/10.4236/jgis.2015.76056> (18 pages).
Javier Tejedor et al., "Machine Learning Methods for Pipeline Surveillance Systems Based on Distributed Acoustic Sensing: A Review," Journal of Applied Sciences 2017, 7, 841 (published online Aug. 16, 2017). Retrieved on Sep. 9, 2024 from the Internet: <URL: www.mdpi.com/2076-3417/7/8/841> (26 pages).
Bahareh Inanloo et al., "A decision aid GIS-based risk assessment and vulnerability analysis approach for transportation and pipeline networks," Safety Science 84 (2016) 57-66 (published online Apr. 2016). Retrieved on Sep. 9, 2024 from the Internet: <URL: www.sciencedirect.com/science/article/abs/pii/S0925753515003161> (11 pages).
Adewumi Rowland, "GIS-Based Prediction of Pipeline Third-Party Interference Using Hybrid Multivariate Statistical Analysis," PhD Thesis, School of Marine Science and Technology, Newcastle University Newcastle Upon Tyne (published online Dec. 2010). Retrieved on Sep. 9, 2024 from the Internet: <URL: theses.ncl.ac.uk/jspui/handle/10443/2529> (317 pages).
Lei Ma et al., "Quantitative risk analysis of urban natural gas pipeline networks using geographical information systems," Journal of Loss Prevention in the Process Industries, vol. 26, Issue 6 (published online Nov. 2013). Retrieved on Sep. 9, 2024 from the Internet: <URL: doi.org/10.1016/j.jlp.2013.05.001> (pp. 1183-1192).
Hassan Al-Barqawi, et al., "Condition Rating Model for Underground Infrastructure Sustainable Water Mains," Journal of Performance of Constructed Facilities, vol. 20, No. 2, May 2006 (published online May 1, 2006). Retrieved on Sep. 9, 2024 from the Internet: <URL: ascelibrary.org/doi/abs/10.1061/(ASCE)0887-3828(2006)20:2(126)> (11 pages).

* cited by examiner

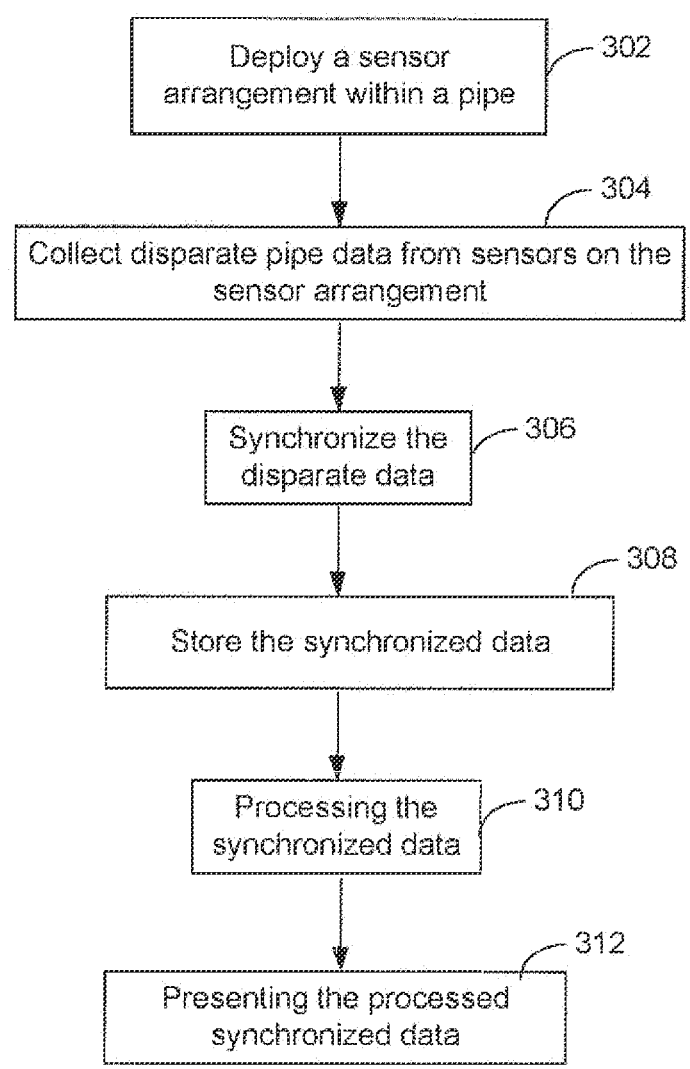

Figure 8 — 802
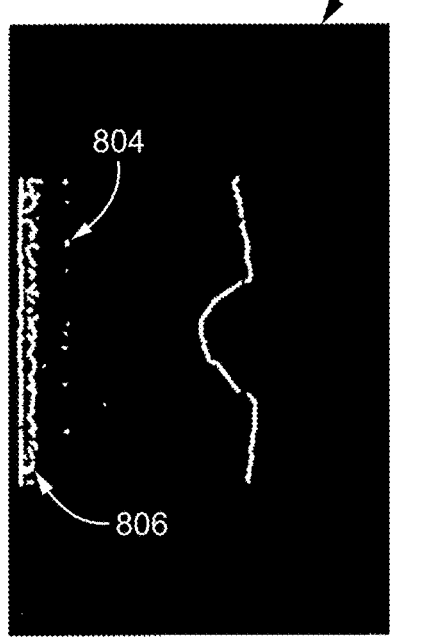
Figure 9 — 902
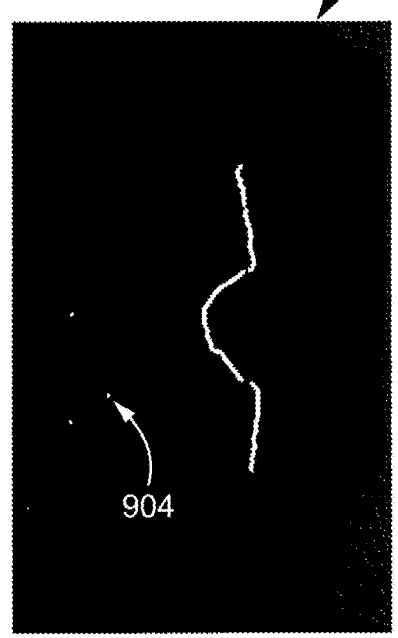
Figure 10 — 1002
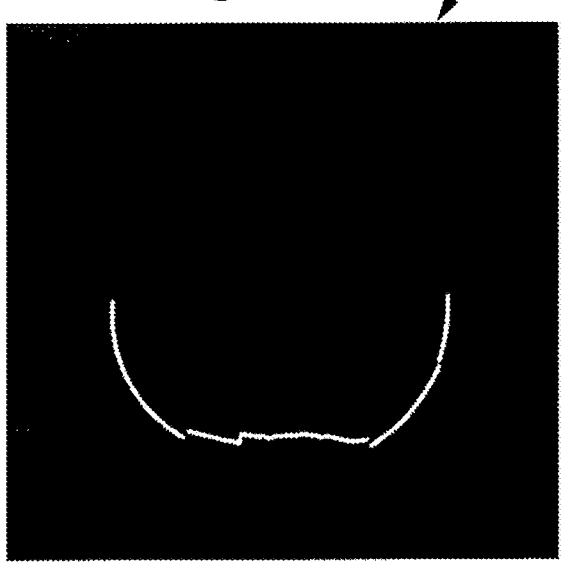
Figure 11
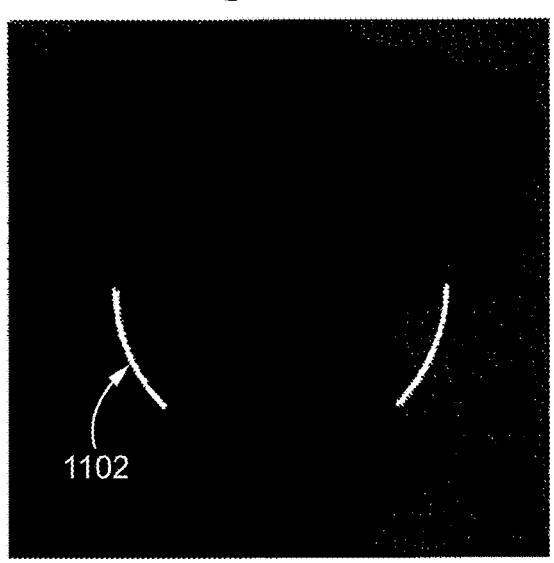

Figure 22

| Name | Parameters | Shape | Name | Parameters | Shape |
|---|---|---|---|---|---|
| Circular | Full Height |  | Circular Force Main | Full Height Roughness |  |
| Filled Circular | Full Height Filled Depth |  | Rectangular-Closed | Full Height, Width | 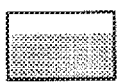 |
| Rectangular-Open | Full Height, Width | 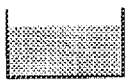 | Trapezoidal | Full Height, Base Width, Side Slopes | 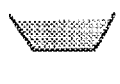 |
| Triangular | Full Height, Top Width |  | Horizontal Ellipse | Full Height, Max Width |  |
| Vertical Ellipse | Full Height, Max Width | 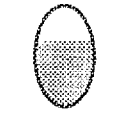 | Arch | Full Height, Max Width |  |
| Parabolic | Full Height, Top Width |  | Power | Full Height, Top Width, Exponent |  |
| Rectangular-Triangular | Full Height, Top Width, Triangle Height | 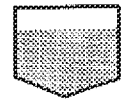 | Rectangular-Round | Full Height, Base Width, Bottom Radius |  |
| Modified Baskethandle | Full Height, Top Width |  | Egg | Full Height |  |
| Horseshoe | Full Height |  | Gothic | Full Height |  |
| Catenary | Full Height | 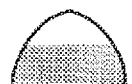 | Semi-Elliptical | Full Height |  |
| Baskethandle | Full Height |  | Semi-Circular | Full Height |  |
| Irregular Natural Channel | Transect Coordinates |  | Custom Closed Shape | Full Height, Shape Curve Coordinates |  |

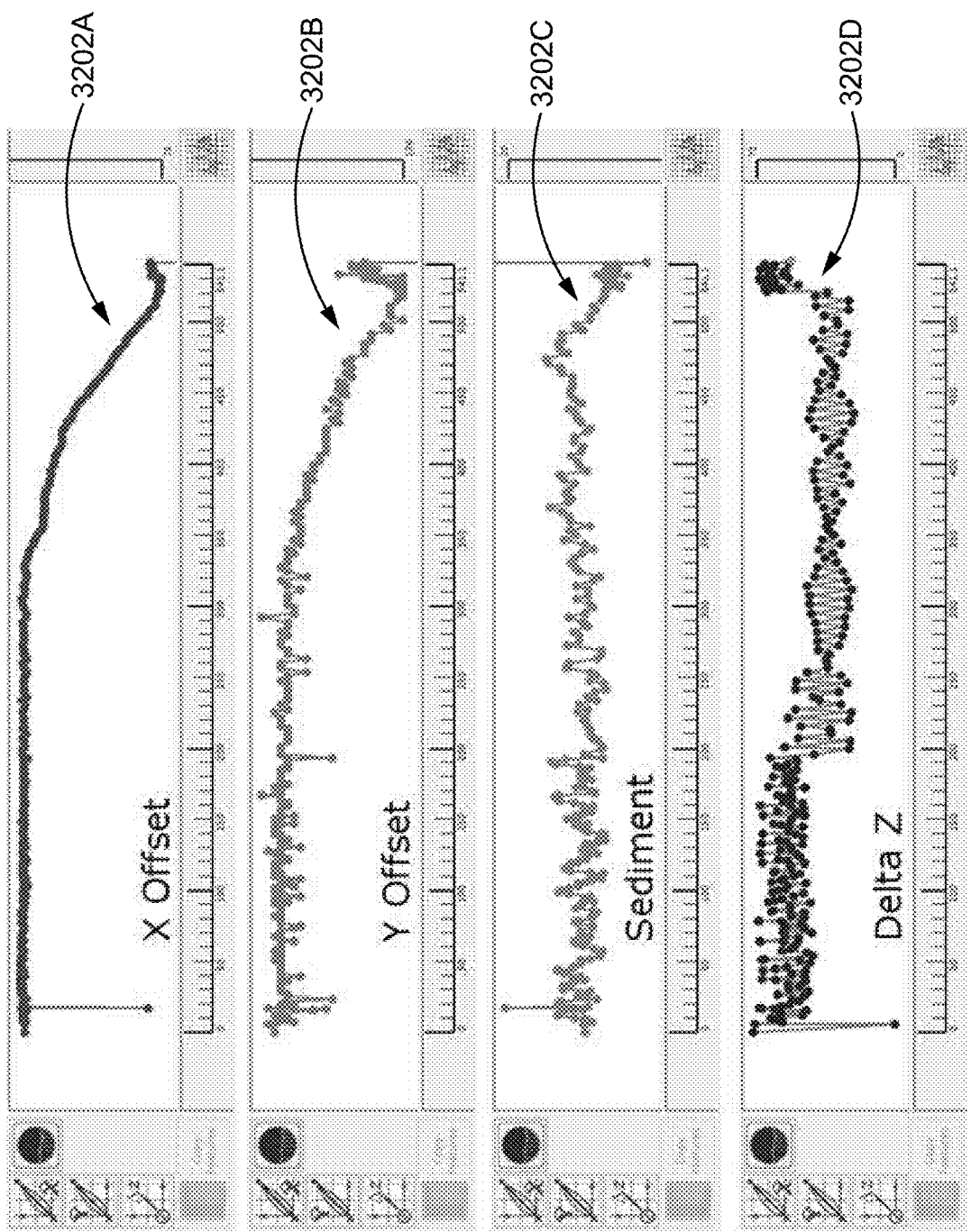
*Figure 32A*  *Figure 32B*  *Figure 32C*  *Figure 32D*

MULTI-SENSOR PIPE INSPECTION SYSTEM AND METHOD

CROSS REFERENCE TO RELATED APPLICATIONS

This application is a continuation application of U.S. patent application Ser. No. 16/402,832, filed on May 3, 2019, which claims the benefit of U.S. Provisional Patent Application Ser. No. 62/667,267 filed on May 4, 2018, to which priority is claimed pursuant to 35 U.S.C. § 119(e), and which is incorporated herein by reference in its entirety.

TECHNICAL FIELD

The present disclosure is directed to infrastructure inspection systems and methods.

BACKGROUND

Uncertainty about the location and condition of infrastructure assets and lack of comprehensive planning often leads to a reactive approach to maintenance and the occurrence of emergency situations stemming from asset failures. Consequences of utility catastrophic failure may cause damage to nearby property, business losses, posing a threat to public health and safety, interruption of service, and increasing cost of emergency repair or replacement.

SUMMARY

A system for collecting disparate data within a pipe involves a sensor arrangement configured to be deployed within the pipe. The sensor arrangement comprises a plurality of sensors configured to detect disparate data related to the pipe. Each sensor of the plurality of sensors is coupled to a respective collection computer on the sensor arrangement. A synchronization module is configured to synchronize the disparate data. A database is configured to store the synchronized data. A processor is configured to process the synchronized data. A user interface configured to present the synchronized data to a user.

A method for collecting disparate data within a pipe involves deploying a sensor arrangement within the pipe. Disparate data related to the pipe is collected using a plurality of sensors. The disparate data from the plurality of sensors is synchronized. The synchronized data is stored in a database. The synchronized data is processed and presented to a user.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 3A illustrates a process for collecting disparate data using a sensor arrangement configured to be deployed in a pipe in accordance with embodiments described herein;

FIG. 8 shows an example of a polar image in accordance with embodiments described herein;

FIG. 9 shows a final filtered polar image in accordance with embodiments described herein;

FIG. 10 illustrates the transformation from polar to Cartesian coordinates in a 500×500 pixel image in accordance with embodiments described herein;

FIG. 11 shows the template corresponding to the example shown in FIG. 10 in accordance with embodiments described herein;

FIG. 22 and FIGS. 23A-23F show examples of pipe shapes that may be encountered in accordance with embodiments described herein;

FIGS. 32A-32D illustrate the Multi-Context Interactive 2D Tool, which provides a view over the length of the pipe for values derived in the pre-processing step in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
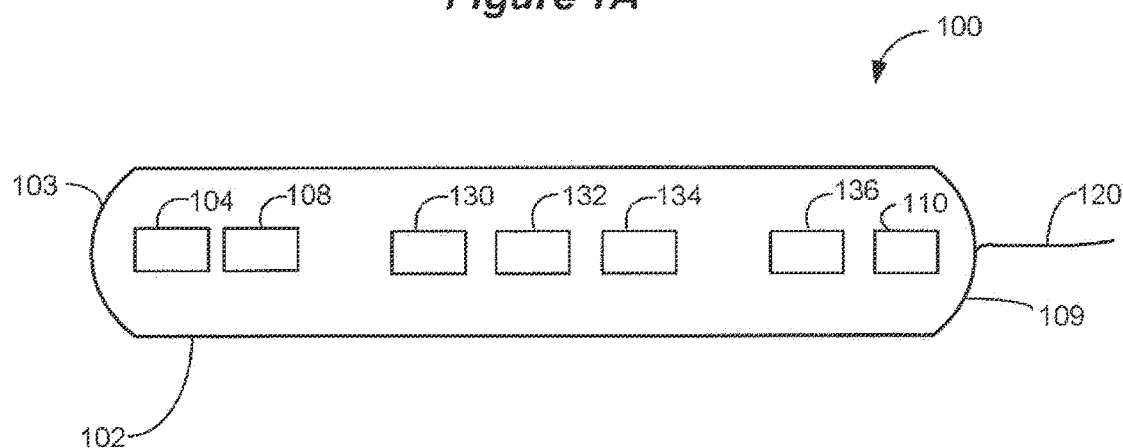
FIGS. 1A-1C show a floating or roving sensor arrangement in accordance with embodiments described herein.

The nation's wastewater and storm water conveyance infrastructure is aging, with a substantial proportion nearing the age of useful life. Increased expenditure requirements in tandem with declining revenue, growing population and migration to incorporated areas, development resulting in changing land cover promoting run-off, and climate change resulting to more frequent and intense extreme weather events are exacerbating factors that lead to additional loads on the existing infrastructure. According to a series of recent reports from the United States Environmental Protection Agency, the average rate of system rehabilitation and upgrading of sewer utilities within the U.S. is still not adequate to keep pace with increasing needs, quality demands, and continually deteriorating systems.

Uncertainty about the location and condition of infrastructure assets and lack of comprehensive planning often leads to a reactive approach to maintenance and the occurrence of emergency situations stemming from asset failures. Consequences of utility catastrophic failure may cause damage to nearby property, business losses, posing a threat to public health and safety, interruption of service, and increasing cost of emergency repair or replacement. Implementation of asset management plans, including regular utility inspection, may greatly mitigate the potential for failure. This is done by enabling rational prioritization of utility hard assets needing maintenance, rehabilitation, and replacement, by providing data input to performance and structural deterioration models in the context of the consequences of failure, consequently reducing total costs.

In the past, closed-circuit television (CCTV) has been the mainstay of utility inspection, but for many cases CCTV inspection alone is insufficient. Measuring sedimentation levels and volume can be done more efficiently without bypass pumping and service interruption with the addition of a sonar sensor. Profiling sensors such as sonar, Light Detection and Ranging LIDAR, and ring lasers may be used for precise measurement of minimum interior pipe diameter used for relining operations. The output from the profiling sensors may be used to identify pipe wall erosion and/or pipe shape deformities that may be indicators of pending collapse and/or other failure methods. Recent studies have found that human-mediated visual inspection of CCTV data, and the process of observing and recording defects, is subject to both substantial false negative and false positive errors, with the latter reaching a level of 25% in some case studies. Manual processing and defect identification are time-consuming regardless of the sensors used resulting in increased overall costs.

Systems and methods disclosed herein pertain to data obtained from inspections of subsurface conduits, conveyances or void networks. More particularly, the disclosed systems and methods pertain to gathering, integrating, organizing, processing and visualizing data obtained from subsurface utilities for fluid conveyance.

According to various embodiments, systems and methods can comprise, or be implemented by, at least one processor, computer memory, and a software pre-processor employing numerical and computer vision algorithms for automatically transforming distinct datasets consisting of individually time-stamped measurements collected from a pipe interior combined with dynamic models to create a project-oriented normalized relational database. The resulting project database is accessible by an interactive processor, graphical user interface (GUI), and/or a database interface for presenting a contextually rich view for quality control (QC). The project databased may be used to flexible generation of geo-referenced visual and/or textual reports for the end customer. Various embodiments provide for generating customer deliverables and unique visualization products derived from multi-sensor pipe inspections.

Embodiments described herein bring together disparate data (e.g., digital, analog, mechanical, electromagnetic, optical, seismic, acoustic, and/or electro-optical) in raw form to create a contextually rich and actionable output. Embodiments described herein relate to creating an output that is a time-indexed 3D geometrical representation of pipe structural and material defects. The output is referenced from the pipe start point in units of length and stored in a normalized database for the purpose of assessing pipe network performance and time-dependent performance deterioration. Embodiments are directed to creation of pipe inspection project data without human intervention. The pipe inspection project data may include pipe profiles located and centered along pipe segments that provides unique and unified interactive multiple 2D and 3D views to the Data Analyst (DA) and/or to the end customer. According to embodiments described herein, all data and/or metadata is stored to a database in normalized form (e.g., Third Normal Form or 3NF).

According to embodiments described herein, the outputs of multiple sensors deployed within a pipe, by any means, are collected and used to reconstruct and represent the geometry, relative position, absolute geo-referenced location, conditional assessment, and/or other attributes of pipeline infrastructure including location and hydraulic cross-sections. In various embodiments, this is achieved through a combination of algorithms, machine vision, numerical analysis, relational modeling, machine learning, recognition of repeating features, and/or other methods. The original outputs, reconstruction and processing parameters, aggregate models, and classifications are stored in an electronic platform, which provides for an extensible multi-dimensional data aggregate from which output is produced. The output comprises a 3D geo-referenced geometric reconstruction, performance deterioration model, and/or the rates of change therein. In embodiments described herein, the outputs and/or deliverables are presented as multiple synchronous and contextual views to emphasize the relationships between the numerical and categorical attributes, geometry, location, and/or temporal dynamics. These outputs may be aggregated by scripts which run with or without intervention with a first phase deliverable that includes an exception report for DA review. After data aggregation, final deliverables are produced in a form desired by the end customer.

Figure 1B:
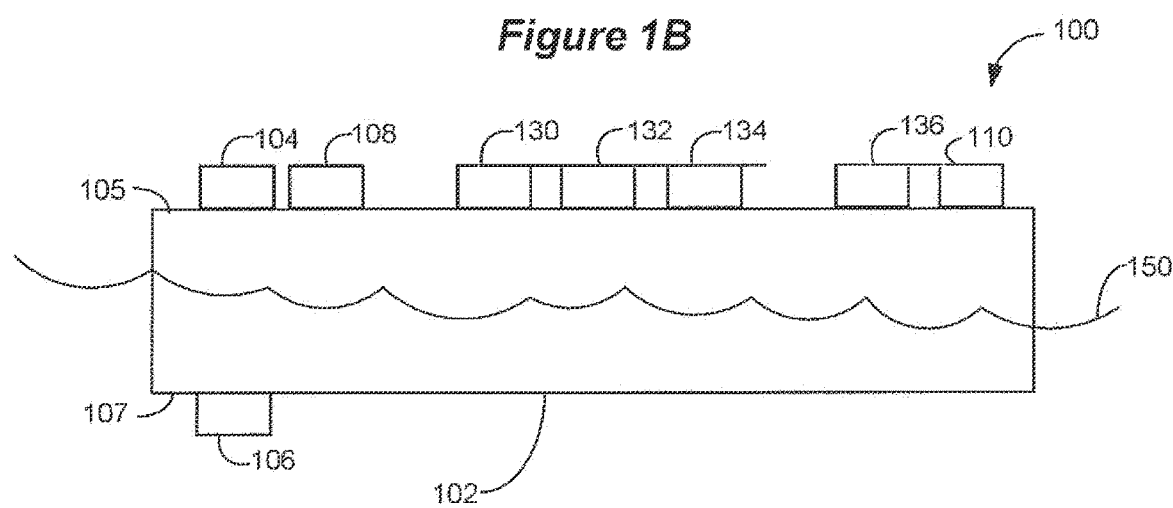
Figure 1C:
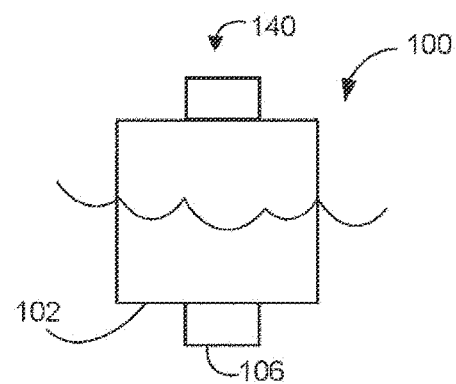

FIGS. 1A-1C show views of a sensor arrangement 100 in accordance with embodiments described herein. FIG. 1A shows a top view of the sensor arrangement. According to embodiments described herein, the sensor arrangement 100 can float and/or operate under its own locomotion. The sensor arrangement includes a support structure 102 to which a number of sensors are mounted. The support structure may comprise a floating platform, for example. The support structure 102 can comprise a single hull or multiple hulls. The support structure 102 can support one or more sensors. A cable 120 terminates at the rear 109 of the support structure 102. The cable 120 may be connected to a powered reel. The powered reel may be configured to provide locomotion to the sensor arrangement 100. For example, the reel can increase and/or decrease the length of cable payout. Mounted on the top 105 and near the front 103 of the sensor arrangement 100 is a camera 104. The camera 104 captures images above the flow line as the Platform 100 advances through a pipe. The camera 104 can be a low light, high definition CCTV, which captures images at a rate of 30 frames/sec, for example. The camera 104 may be a high-resolution digital camera with wide-angle lens. Optionally, one or more lights can be mounted to the top 105 of the sensor arrangement 100 to provide additional light for the camera 104 as shown in the side view of the sensor arrangement of FIG. 1B.

A sonar 106 is mounted to the bottom 107 of the sensor arrangement 100, such that the sonar 106 is below the water line 150 during operation as shown in FIG. 1B and end view of the sensor arrangement of FIG. 1C. In some embodiments, the sonar 106 operates at a rate of 1 Hz/scan, providing 400 points/sec. In the embodiment shown in FIGS. 1A-1C, the support structure 102 supports two LIDAR type sensors 108, 110. According to embodiments described herein, the first LIDAR sensor 108 is mounted such that the scan starting point is about 180 degrees vertically displaced from the second LIDAR scan start point. In embodiments described herein, each of the sensors 108, 110 has a 270° range, operates at a rate of 40 Hz/scan, and provides 43,200 points/sec. FIG. 1C shows sensor group 140 that includes sensors 104, 108, and 110 and computers 130, 132, 134, and 136. It is understood that the sensor arrangement 100 can support a number of other sensors, including one or more accelerometers, gyroscopes, magnetometers, integrated Inertial Measurement Units (IMU), and ring-lasers. Power can be supplied to the sensors 104, 106, 108, 110 from an on-board battery. As will be described herein below, data collected from the sensors 104, 106, 108, 110 can be used to determine internal pipeline geometry, condition, damage, defects, ovality, hydraulic cross-sectional occlusion, sediment volume, and lateral location.

It can be appreciated that the sensors 104, 106, 108, 110 mounted to the support structure 102 operate at different scan rates and, initially, are not synchronized in time or space. Each of the sensors 104, 106, 108, 110 may be coupled to a collection computer 130, 132, 134, 136 on the support structure 102. Data produced by the sensors 104, 106, 108, 110 is timestamped and synchronized using a "heartbeat" signal running between the different collection computers and any external computer, such as one on a support vehicle. The "heartbeat" signal is a network transmission control protocol (TCP), user datagram protocol (UDP), or other network protocol broadcast time signature in universal coordinated time (UTC-Z) used to synchronize the clocks on the collection computers 130, 132, 134, 136. Using the heartbeat signal may ensure that the logging software used to record the constituent sensor elements is recording with a similar clock. This synchronization is achieved by continuously reapplying a time offset to the onboard clock of all recording computers that receive it. The local network lag time is expected to be sub-millisecond and therefore sufficiently accurate in longitudinal (Z space) alignment of the various telemetry signals.

Use of the "heartbeat" signal provides for time-synchronization between the different sensors operating at difference scan rates. The distance encoder is considered the reference by which any constituent network signal is aligned longitudinally (Z space). By knowing the physical/kinematic offset of the sensor plane in space referenced to the body, encoder line attachment point, or other arbitrary reference point, and doing a time-based alignment or corresponding interpolation to the aligned encoder Z value, the sum provides the Z value for the sensor reading in question.

Figure 2:
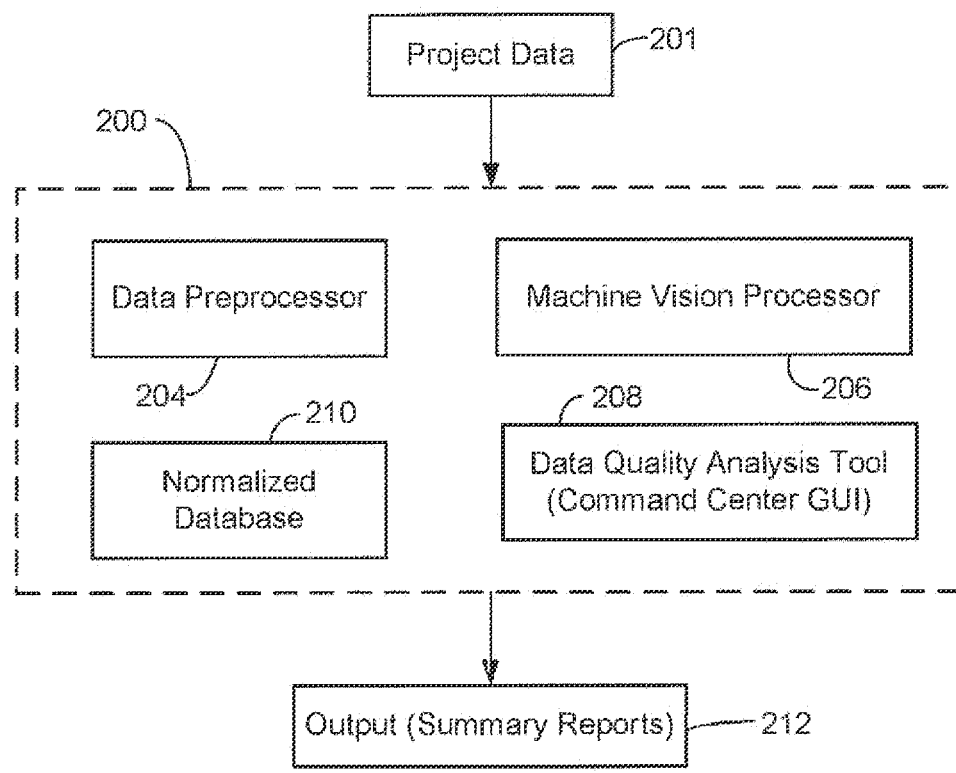
FIG. 2 is a block diagram of a system for processing project data, including data from multiple sensors in accordance with embodiments described herein.

FIG. 2 is a block diagram of a system for processing project data, including data from multiple sensors (see FIG. 1), and providing various 3D and 2D views of the integrated pipe data and various pipe parameters in accordance with embodiments described herein. The system 200 shown in FIG. 2 can be configured to implement a semi-automated method for generating customer deliverables and unique visualization products derived from multi-sensor pipe inspections.

Advantageous features of the system 200 include fully automated processing of inspection data and inspection database population of results upon arrival from the field, unique software tools allowing for automated and semi-automated QC of data by statistical analyses and other methods, and a Co-registered Quad View presentation of the raw sensor and calculated data with user-controlled viewpoints.

The system 200 includes a Data Preprocessor 204, a Machine Vision Processor 206, a Normalized Database 210, and a Data Quality Analysis Tool 208. The Machine Vision Processor 206 can be integral to the Data Preprocessor 204. Raw project data 201 is processed by the Data Preprocessor 204, which produces 3D pipe feature data, related contextual data, and/or metadata. The Data Preprocessor 204 includes a Quality Analysis Preprocessor Module that performs a number of operations, including pre-loading a reference geographic information system (GIS) datastore with all asset designations, locations, and/or nominal parameters for a given project designation. In some embodiments, raw data individual files are partitioned by size using a load-balancing algorithm and distributed for processing concurrently in parallel across a network of computers.

The Normalized Database 210 is updated in third normal form, for example, with the project data comprising the raw binary data and processing results, including all processing parameters and metadata. The data, parameters, and metadata are input to the Data Quality Analysis Tool 208, which includes a Visualization Command Center graphical user interface (GUI). As will be described in detail below, the Data Quality Analysis Tool 208 is an interactive software tool that provides a DA with various tools for viewing and editing multi-sensor data for each inspection run in a project. The Data Quality Analysis Tool 208 can produce various outputs 212, including various summary reports and files (e.g., sedimentation loading) for the end customer. the user interface is configured to receive parameters from a user; and the processor is configured to re-determine the profile deviations based on the received parameters.

The Machine Vision Processor 206 is configured to perform image processing (e.g., noise filtering) of data produced by various sensors, such as the sonar 106 and LIDAR sensors 108, 110 (see FIG. 1) on data that has been converted into an appropriate visual context. In some embodiments, the Machine Vision Processor 206 is configured to operate on user-defined templates, and perform graphical processing unit (GPU)-accelerated template matching. The Machine Vision Processor 206 is configured to implement a sediment detection algorithm for detecting and quantifying sediment in the pipe.

The system 200 provides a number of advantages over conventional pipe inspection techniques, such as reducing manual analysis time, increasing automation, improving accuracy and reliability of pipe geometry reconstruction, geo-location of the pipe and its defects, and increased automatic defect identification. For example, a pipe inspection project using a conventional approach can take on the order of weeks or months to complete. In contrast, the same pipe inspection project can be completed within days when conducted using systems and methods of the present disclosure. These advantages are achieved by a unique innovative process that factors the problem into a hierarchical set of tasks.

The first process is a set of tasks performed in software by the Data Preprocessor 204 and Machine Vision Processor 206 shown in FIG. 2. This set of tasks takes as input numerical values comprising raw field data collected from the sensors (see FIG. 1), timestamps for each data point, related data on geo-referenced location, asset IDs, as-builts, sensor error models, and/or sensor metadata comprising sensor type, model, resolution, and/or sampling rate. Default settings are used to integrate and process the inputs of each individual sample using default parameters to remove sensor noise using default parameters to output a geometric and contextual representation. In some embodiments, the numerical processing is parallelized and distributed over a heterogeneous network of computers using a load-balancing algorithm. All raw and processed data is stored along with the metadata and processing parameters in a relational database (e.g. normalized database 210) in third normalized form. All or part of the process can be automatic, triggered by the availability data collected from the field, and may be completed without human intervention. There is also the capability for fast viewing of sample data to modify the default processing parameters for data with unusual noise characteristics or unexpected shape parameters. The software is flexible with respect to the type of sensor data available, allowing processing from a variety of sensors using a 'bolt-on' approach adjustable to customer requirements and 'level-of-service' pricing model.

The second process is a set of tasks performed in interactive software implemented by the Data Quality Analysis Tool 208 shown in FIG. 2. The Data Quality Analysis Tool 208 may be referred to a quality control module herein. This interactive software provides a 3D view of the integrated pipe data combined with co-registered selectable 2D sensor slices and a unique 2D interactive selectable view of the relevant pipe parameters, along with a view of the project database. This interface provides an actionable view for quality control (QC) with rapid identification of anomalies and capabilities for editing of geometry, features, and/or attributes. Editing of anomalies automatically triggers re-processing for complete correction of dependent features (i.e., correction of pipe cross-section may trigger automatic recalculation of sediment surface detection). All corrections and related processing parameters are updated in the Normalized Database 210. It is noted that, when defect recognition and coding is performed in the field, the time taken to slow and stop the sensor arrangement manually, to classify and label the defect, and start moving the sensor arrangement again may greatly exceed the simple traversal time of the pipe. According to embodiments described herein, the deviations may be classified as one or more of pipe deformations, pipe defects and sediment deposits. In some cases, for video recorded using full-view cameras with virtual Pan, Tilt, and Zoom (PTZ), both the defect coding and QC steps can be performed in-house.

Quality control (QC) is a set of activities for ensuring quality in products. The activities begin with identifying defects in the actual products produced. QC aims to identify (and correct) defects in the finished product. In the QC process implemented by the interactive software of the Data Quality Analysis Tool 208, the DA can review the entire CCTV video, verifying defects and the accuracy of corresponding fault coding, e.g., Pipeline Assessment Certification Program (PACP) codes that were identified in the field, while looking for additional defects that may have been missed by the certified field operator (CFO). As part of the QC process, the DA can complete a 2×2 matrix error matrix, True Positive (TP), True Negative (TN), False Positive (FP), and False Negative (FN). Performance measures are derived from the matrix as shown in FIG. 1 derived from Francois Bremond, "Scene Understanding: Perception, Multi-Sensor Fusion, Spatio-Temporal Reasoning and Activity Recognition", PhD thesis, University of Nice—Sophia Antipolis, July 2007.

TABLE 1

Performance Measures

| | Data | Noise | |
|---|---|---|---|
| Defect Coding | True Positive (TP) | False Positive (FP) | Precision TP/(TP + FP) |
| Quality Control | False Negative (FN) Sensitivity TP/(TP + FN) | True Negative (TN) Specificity TN/(TN + FP) | |

Additionally, the QC process can identify misclassification errors (defects correctly found but incorrectly classified).

FIG. 3A illustrates a process for collecting disparate data using a sensor arrangement configured to be deployed in a pipe in accordance with embodiments described herein. A sensor arrangement is deployed 302 within a pipe. According to embodiments, the sensor arrangement is a floating platform that is deployed in the pipe. Disparate data from sensors of the sensor arrangement is collected 304. The disparate data is synchronized 306. The synchronized data is stored 308 in a memory. The synchronized data is processed 310 to produce an output. The processed synchronized data is presented 312 to a user (e.g., a DA) via a user interface.

Figure 3B:
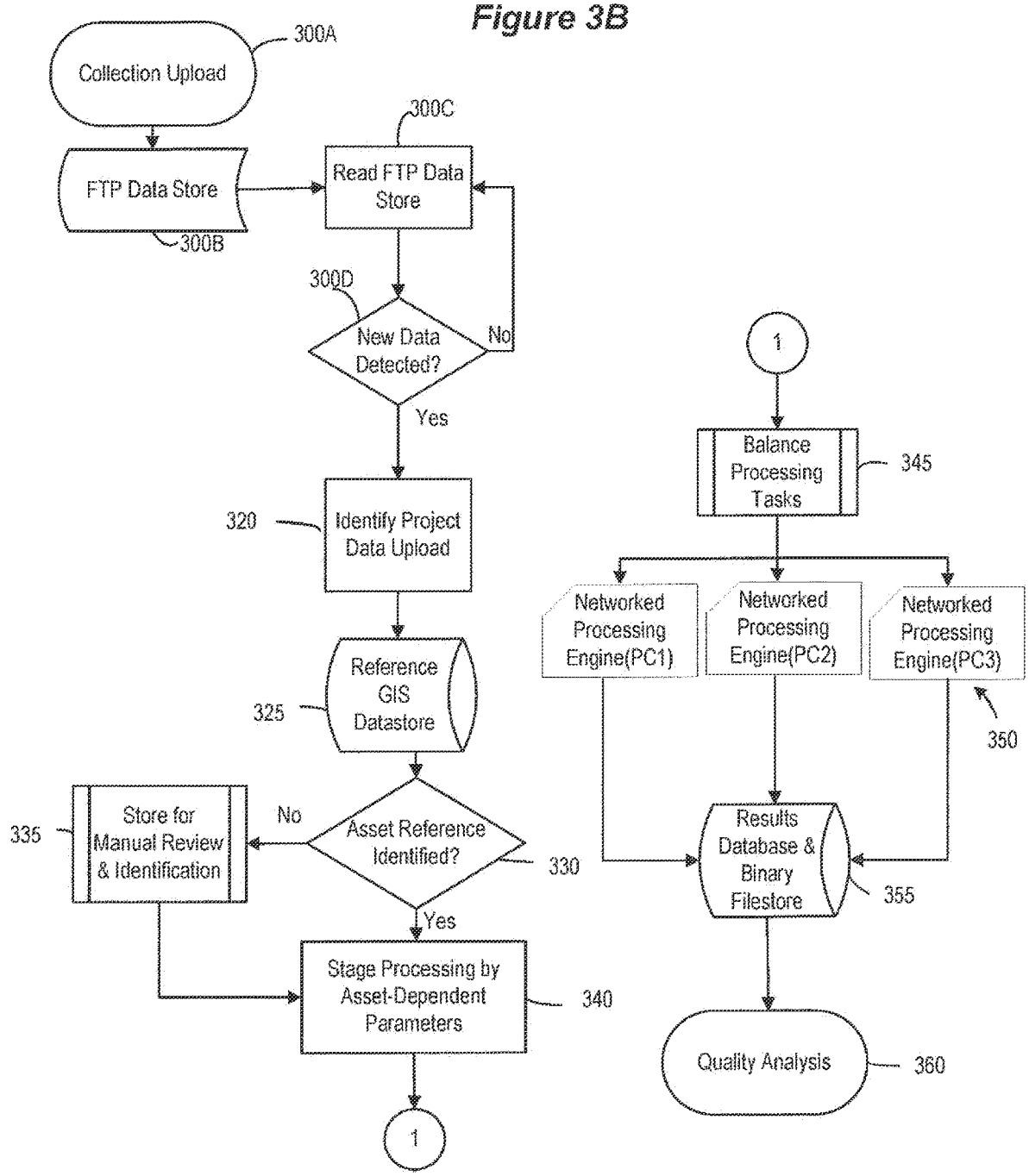
FIG. 3B is a flow chart of various processes implemented by a front-end Quality Analysis Pre-processor Module of the Data Preprocessor in accordance with embodiments described herein.
Figure 4:
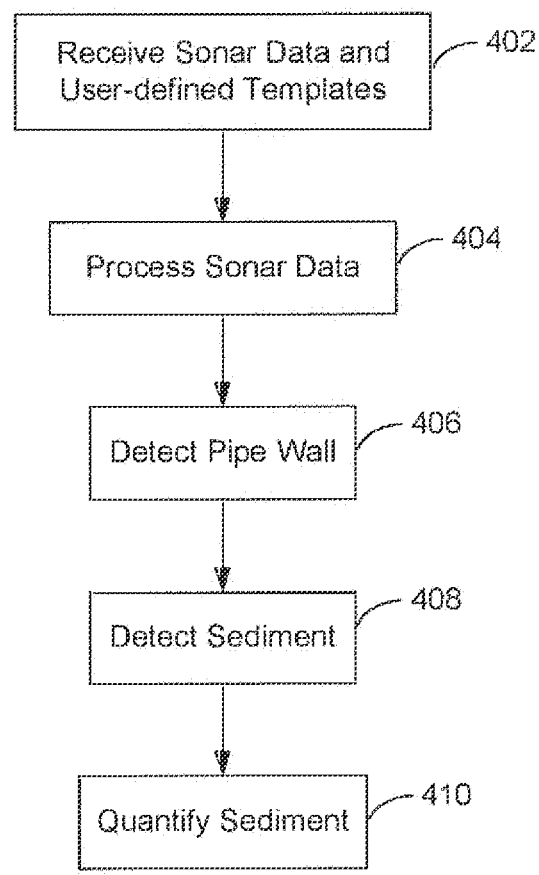
FIG. 4 is a high-level flow chart showing various processes implemented by the Data Preprocessor and Machine Vision Processor when processing data obtained from the sonar in accordance with embodiments described herein.

FIG. 3B is a flow chart of various processes implemented by a front-end Quality Analysis Pre-processor Module of the Data Preprocessor 204 shown in FIG. 2 in accordance with embodiments described herein. The raw project data is uploaded 300A. The raw project data may be the data collected in FIG. 3A, for example. According to various configurations, the raw project data is processed automatically upon arrival, yielding three dimensional (3D) pipe feature data, related contextual data, and metadata, in preparation for input into a quality analysis pre-processor tool. As an example, an overview of back-end pre-processing for sonar data is shown in FIGS. 4 and 5. The processes for the front-end Quality Analysis Pre-processor Module are shown in FIG. 3B.

A file transfer protocol (FTP) data store 300B is queried 300C, 300D periodically by the processor front-end until a data upload is detected 300D. When the data upload is detected 300D, the project corresponding to the data upload is identified 320. According to various embodiments, the project designation is determined from a unique alphanumeric key that is associated with the data upload. A reference GIS Datastore 325 is pre-loaded upon project initiation with all asset designations, locations, and nominal parameters such as pipe shape, material, and/or diameter. In general, the asset designations are unique identifiers determined by the customer preference, typically having the form of two unique manhole ID's or a single pipe ID. The geo-locations of the pipe endpoints may be provided by the customer with the accuracy refined by global positioning system (GPS) measurements in the field when needed.

The raw field data file designations are compared to the entries in the GIS Datastore 330 and either set aside for manual examination if no match is found 335 or prepared for processing using the stored nominal asset parameters 340. According to various embodiments, the raw data individual files are partitioned by size using a load-balancing algorithm that considers computer hardware processor availability, type and capacity 345. The individual files are then distributed for processing across a generally inhomogeneous network of computers 350 for processing into the 3D pipe feature data and related contextual data. A relational database filestore 355 (e.g., Normalized Database 210 in FIG. 2) is updated in third normal form with the project data. The project data comprises the raw binary data and processing results including all processing parameters and metadata for input to the Data Analyst Quality Analysis Tool 360 (e.g., tool 208 in FIG. 2).

FIG. 4 is a high-level flow chart showing various processes implemented by the Data Preprocessor 204 and Machine Vision Processor 206 (FIG. 2) when processing data obtained from the sonar 106 (FIG. 1) in accordance with embodiments described herein. The method shown in FIG. 4 involves receiving 402 sonar data and, in some embodiments, user-defined templates. The user-defined templates can include templates for special case pipe geometry, e.g., pipe shape, noise parameters, and/or sediment. The sonar data is processed 404, and the pipe wall (and pipe features) is detected 406 using the processed sonar data. Sediment in the pipe is detected 408 and quantified 410 (e.g., sediment levels and volume). It is noted that the processes shown in FIG. 4 can be implemented using data from any number of different sensors other than sonar.

Figure 5A:
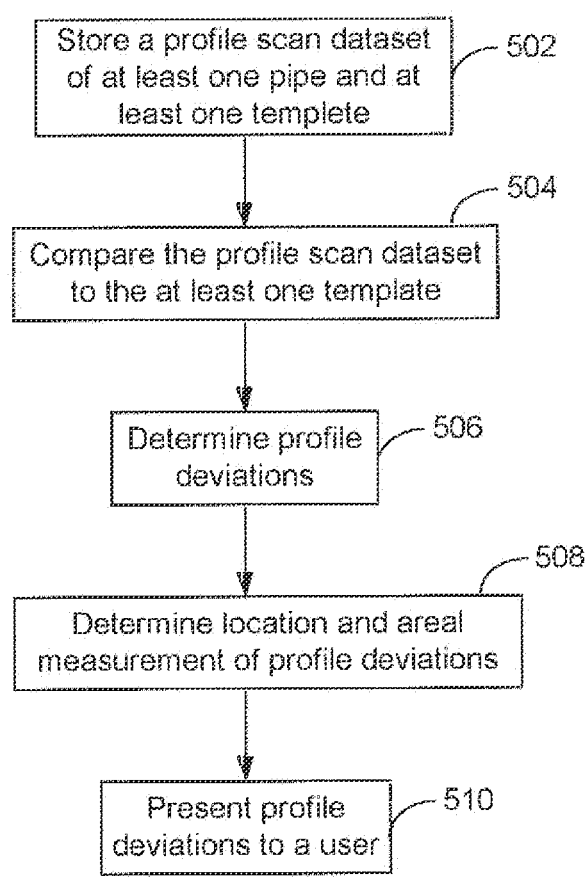
FIG. 5A illustrates a process for processing the data collected in conjunction with FIG. 3A in accordance with embodiments described herein.

FIG. 5A illustrates a process for processing the data collected in conjunction with FIG. 3A in accordance with embodiments described herein. A profile scan dataset of at least one pipe and at least one pipe template is stored 502. The profile scan dataset is compared 504 to the at least one template. It is determined 506 if there are any profile deviations based on the comparison. A location and areal measurement of the profile deviations is determined 508. The profile deviations are presented 510 to a user (e.g., a DA). According to embodiments described herein, the user interface is configured to facilitate manual adjustment of the profile deviations and/or template position by the user. According to embodiments described herein, the user interface is configured to receive edits to the location and the areal measurement via a quality control module.

Figure 5B:
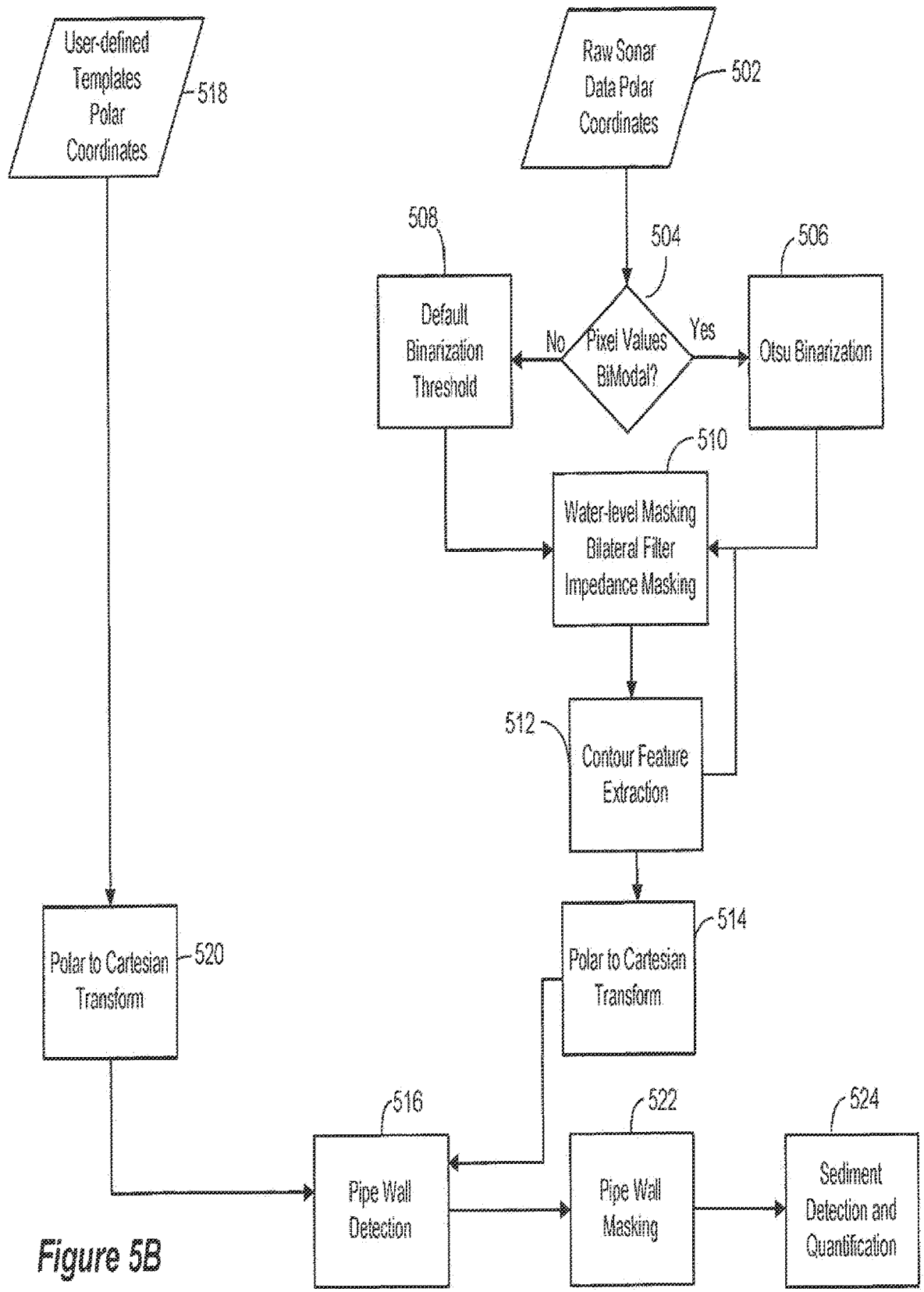
FIG. 5B is another flow chart of various processes implemented by the Data Preprocessor and Machine Vision Processor when processing data obtained from the sonar in accordance with embodiments described herein.

FIG. 5B is a flow chart of various processes implemented by the Data Preprocessor 204 and Machine Vision Processor 206 (FIG. 2) when processing data obtained from the sonar 106 (FIG. 1) in accordance with embodiments described herein. Raw sonar data, expressed in polar coordinates, is received 502. If pixel values are bimodal, Otsu binarization is performed 506, otherwise a default binarization threshold is applied 508 when processing the pixel values. Initial image processing is performed 510, which includes water-level masking, bilateral filtering, and impedance masking. Contour feature extraction 512 is then performed. The polar coordinates are transformed 514 to Cartesian coordinates. The pipe wall is detected 516 using the transformed image. Optionally, user-defined templates, expressed in polar coordinates, may be received 518. The polar coordinates of the user-defined templates may be transformed to Cartesian coordinates. These Cartesian coordinates may then be used to detect 516, the pipe wall. A pipe wall masking process is performed 522, which allows for sediment detection and quantification 524. These processes are described in greater detail hereinbelow.

The following discussion is directed to algorithms and processes implemented by the Data Preprocessor 204 and Machine Vision Processor 206 (FIG. 2) when processing data produced by the sonar 106 (FIG. 1) in accordance with some embodiments. The sonar data is processed to detect the pipe wall, detect pipe features, measure the pipe cross-section and cross-section center, detect sediment in the pipe, and quantify the sediment in the pipe.

The raw data produced by the sonar 106 can be regarded as a matrix of 8-bit unsigned values, 0-255, with the following dimension: rows=number of scans/$2\pi$ radians; columns=samples per scan. A suitable sonar 106 is Pipe Profiling Sonar, model 1512 USB, available from Marine Electronics, LTD (Guernsey, Channel Islands, UK). Typical parameters for the Marine Electronics 1512USB sonar model are: 400 scans @$0.9°$/scan, 250 samples per scan, and a size of 400 rows by 250 columns. By convention, a pixel value zero is viewed as black, pixel value 255 is viewed as white, and pixel values in between are viewed as corresponding shades of gray.

Figure 6:
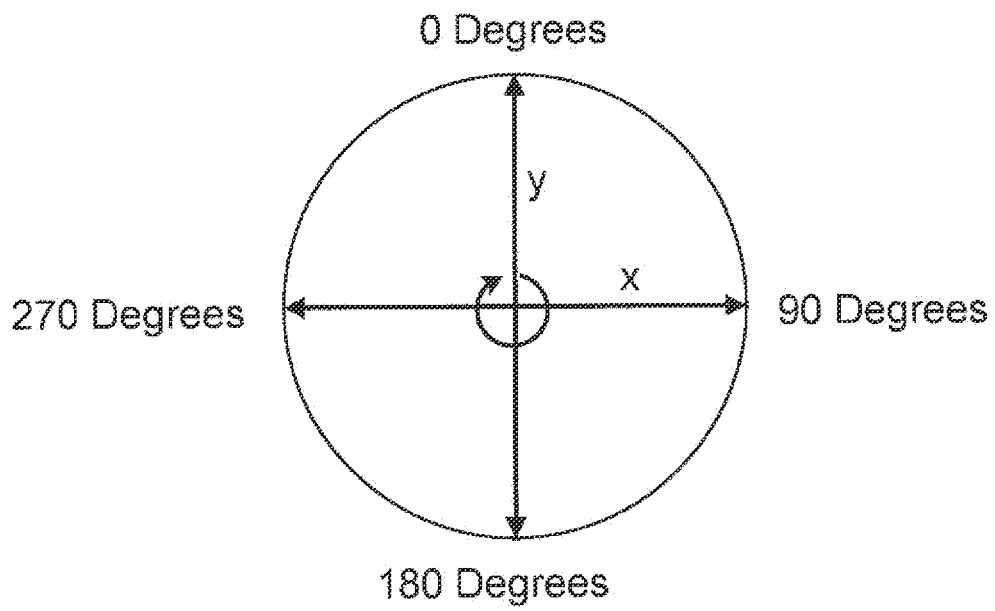
FIG. 6 illustrates a polar coordinate system for processing sonar data in accordance with embodiments described herein.
Figure 7:
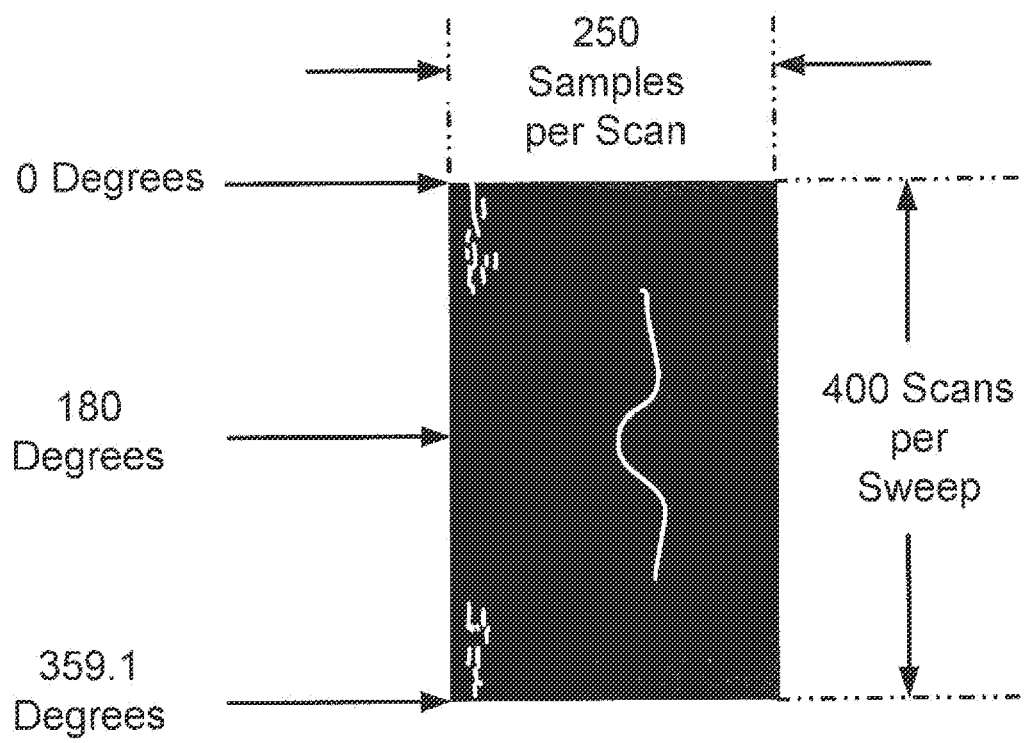
FIG. 7 shows an example of a polar matrix layout in accordance with embodiments describe herein.

The raw sonar data and any user-defined templates are expressed in terms of polar coordinates. The polar coordinate system for sonar data processing is a left-handed system, sometimes known as "Naval Coordinates", as is shown in FIG. 6. An example of a polar matrix layout is shown in FIG. 7. Even though the number of samples per scan may remain the same, the range may change based on different choices for the transmitter (Tx) pulse width and the range-gate setting. The Tx pulse width is a user setting that determines the resolution and range. The range is a user setting as well. Below are example pulse-width vs. range settings that may be used 4 μs: 125 mm to 500 mm
8 μs: 500 mm to 1000 mm
14 μs: 1000 mm to 1500 mm
14 μs: 1500 mm to 2000 mm
20 μs: 2000 mm to 6000 mm Preliminary Image Processing In the following description, the assumption is made that the change in position and angular velocity of the sensor arrangement 100 (FIG. 1) is slow compared to the 1 Hz sweep rate of the sonar 106, so that the pipe cross-sections appear as sections of a circle. Also, any deformation of the pipe may be considered negligible.

Although there are many internal settings for the image processing, a binarization threshold is used to help hide the complexity from the DA. The initial image processing is performed in three steps. The first step involves applying a water-level mask. Since the sonar 106 cannot see above the water-line, blanking is applied above the water line. For a water-level h in a pipe of 2R radius, the blanking in the polar domain is determined by the equation θ=2*a cos(1−h/R). In the example below, h=R, so 2*a cos(1−h/R)=a cos(0)=180°, and with 0.9°/scan, 100 rows are blanked on both the top and the bottom of the raw data polar matrix, leaving the bottom 180° visible in the pipe, equivalent to the central 200 rows in the polar matrix.

Following the first step above, the second step involves applying a bilateral filter to reduce noise while preserving edges. The equation of the bilateral filter is shown in (1).

$$BF[I]_p = \frac{1}{W_p} \sum_{q \in S} G_{\sigma_s}(\|\bar{p} - \bar{q}\|) G_{\sigma_r}(I_p - I_q) I_q \quad (1)$$

The normalization is set as shown in (2).

$$W_p = \sum_{q \in S} G_{\sigma_s}(\|\bar{p} - \bar{q}\|) G_{\sigma_r}(I_p - I_q) \quad (2)$$

Here, S is the space domain of all possible positions in the image, (p, q) are the pixels in image coordinates, p is the center position of the convolution kernel and q a pixel at the distance from the center of the kernel. The kernel functions G have the form shown in (3).

$$G_\sigma(x) = \frac{1}{2\pi} \exp\left(-\frac{x^2}{2\sigma^2}\right) \quad (3)$$

The spatial Gaussian kernel $G_{\sigma_s}$ is the weighted average of the intensity of the pixels centered around p of the pixels q, where σ controls the weighting. It is noted that larger values of $\sigma_s$ result in greater blurring. The range Gaussian kernel $G_{\sigma_r}$ decreases the effect of pixels q with intensity values different from $I_p$, the intensity at pixel p. This multiplicative factor preserves edges while blurring noise. From sonar images that have been processed, it was found that setting the kernel radius to 5 pixels and setting $\sigma_s=\sigma_r=120$ is a good compromise that removes the sonar noise while retaining the sonar features. No reasons were found to vary from these values. This leaves the binarization threshold as the only parameter that the DA needs to choose to get good results.

The third step involves setting of a binarization threshold. The binarization threshold sets the value at which all values at or below the threshold are set to zero, and the values above are set to 255. This gives the DA a simple and easily understood parameter to use to recover the pipe wall and pipe features. The best default value for the binarization parameter depends on the performance of the particular sonar being used as well as the typical environmental conditions for a given work site. In some cases the default value can be set to make the data processing step automatic, so that the DA need only inspect and verify the results as a good QC process warrants.

In the example shown in FIG. 8, the binarization threshold was set to 10, so that all values at or below 10 are set to zero (black), and all values above are set to white (255). In the polar image 802 shown in FIG. 8, a substantial signal 804 can be seen near the sonar source 806, due to the impedance mismatch at the sonar transducer. This noise at and around the sonar center, inside of the pipe, interferes with the sediment detection algorithm. A blanking filter is applied by zeroing out the first 43 columns to obtain the final filtered polar image 902, which is shown in FIG. 9. It can be seen in FIG. 9 that the combined application of the bilateral and blanking filters has left very little noise 904. The transformation from polar to Cartesian coordinates in a 500×500 pixel image 1002 follows, as is shown in FIG. 10. The corresponding template 1102 is shown in FIG. 11.

Contour Feature Extraction

Figure 12:
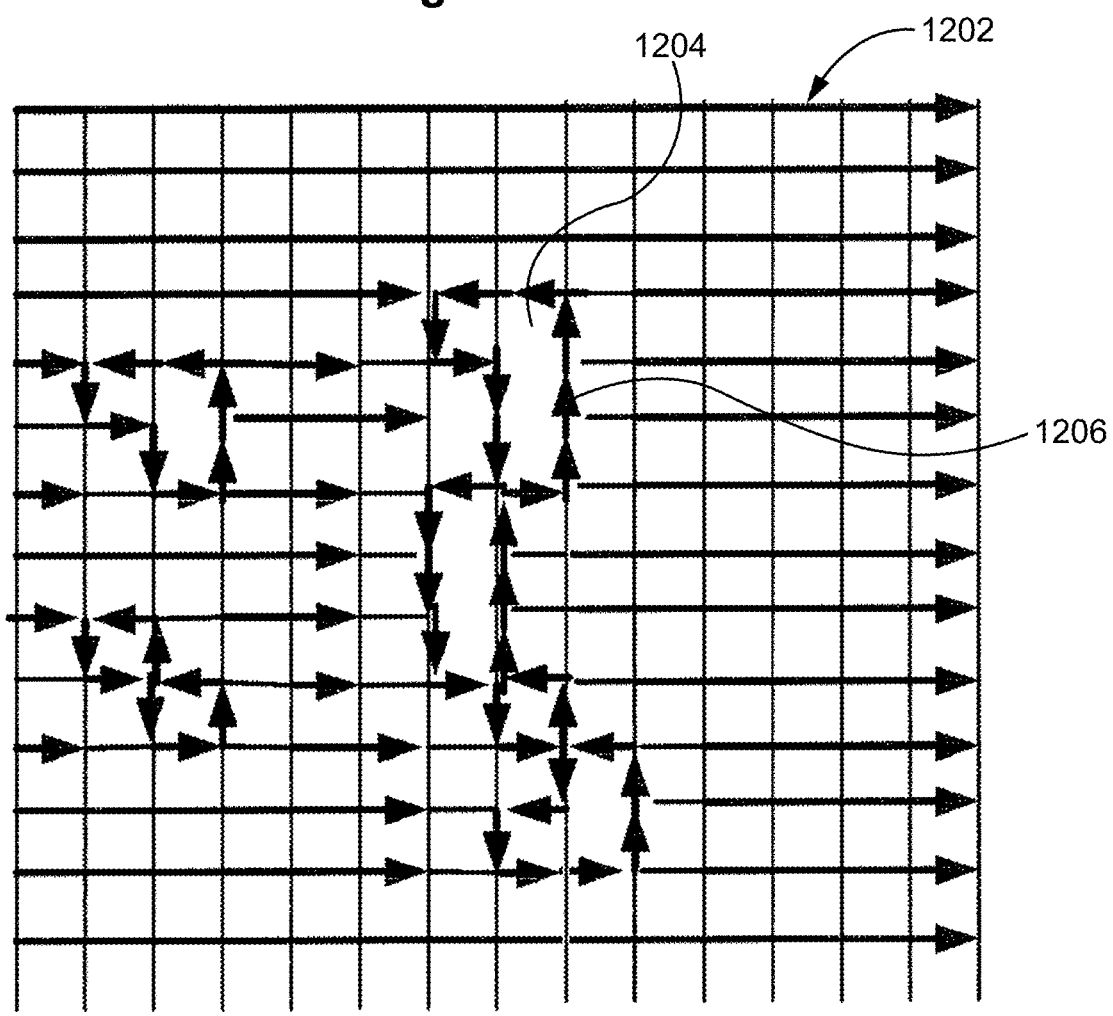
FIG. 12 shows an example where regions with like pixels are traversed counter-clockwise in accordance with embodiments described herein.

A contour detection and feature extraction algorithm is applied to provide further noise removal, improving feature detection over a wider range of binarization thresholds. In general, the contour detection algorithm segments the image 1202 into regions based on perceptual similarity. In the binarized image, the object is to find the 8-connected closed chains of pixels 1204 that surround regions of similar pixels in the image. The closed contours are numbered sequentially, and a hierarchy is created for the case of holes and regions within holes recursively. The rows are scanned, and regions with like pixels are traversed counter-clockwise as indicated by arrows 1206, as depicted in FIG. 12.

In the case of the binarized sonar image, the default threshold binarization and bilateral filtering is applied, along with masking at water-level and around the sonar center. If the binarization threshold is high, it is likely that a portion of the feature pixels will be below the threshold and therefore lost. Additionally, for cases where the signal strength is low and close to the noise level, there may be no threshold that removes all of the noise without severely degrading the feature data. In polar coordinates, the feature data representing the pipe walls and possible sediment in the pipe will span the image up to the water-line mask. The feature data will also be the largest cluster in terms of either area or pixel count due to the bilateral filter and masking. Defining a bounding box around the largest cluster is a convenient method for finding the span of the contour. If some of the feature pixels are missing, a light 3×3 pixel dilation operation is applied to the image, the span is measured again, and the dilation operation is repeated until the expected span is found. The smallest possible dilation may be applied to minimize the possible mixing of the feature contour with nearby noise contours.

Figure 13:
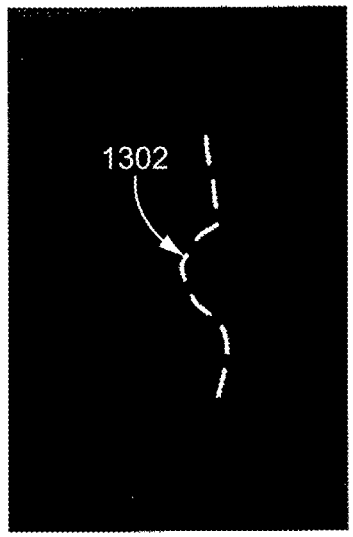
FIG. 13 illustrates an example of raw sonar data in accordance with embodiments described herein.
Figure 14:
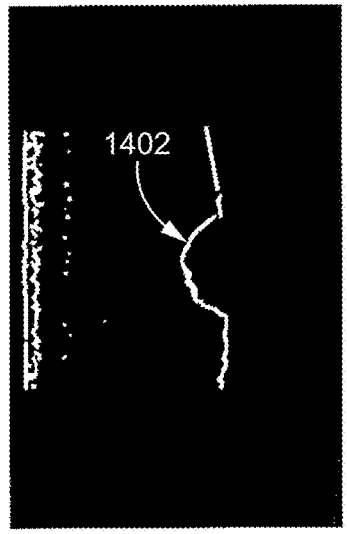
FIG. 14 illustrates the sonar data of FIG. 13 with binarization and water-level masking in accordance with embodiments described herein.
Figure 15:
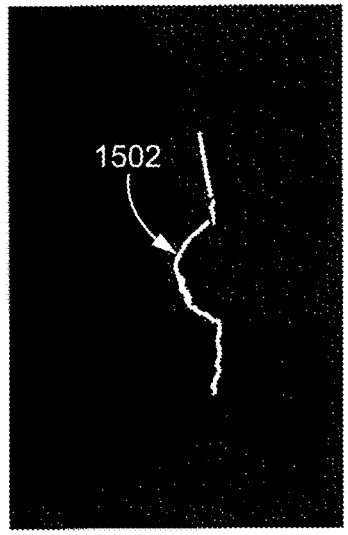
FIG. 15 shows the sonar data of FIG. 14 with a blanking mask in accordance with embodiments described herein.

An example is shown in FIGS. 13-15. FIG. 13 shows raw sonar data 1302. Because the original sonar data 1302 in FIG. 13 is faint, this data is traced using a dashed line for purposes of clarity. FIG. 14 shows the sonar data 1302 of FIG. 13 with binarization and water-level masking 1402. FIG. 15 shows the sonar data of FIG. 14 with a blanking mask 1502. The raw sonar image (FIG. 13) is binarized with threshold=10, and the bilateral filter is applied with water-level masking (FIG. 14). The image shown in FIG. 15 has the blanking mask applied.

Figure 16:
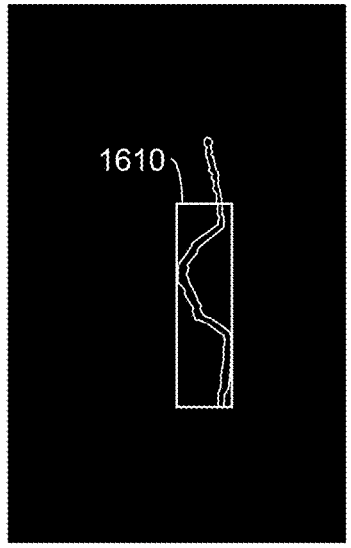
FIG. 16 shows an example of an initial contoured image with a bounding box in accordance with embodiments described herein.
Figure 17:
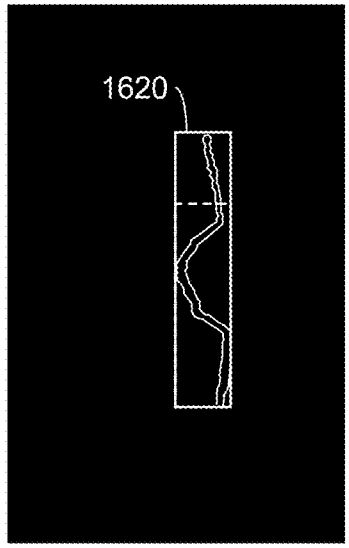
FIG. 17 illustrates the contoured image of FIG. 16 with a dilated bounding box in accordance with embodiments described herein.
Figure 18:
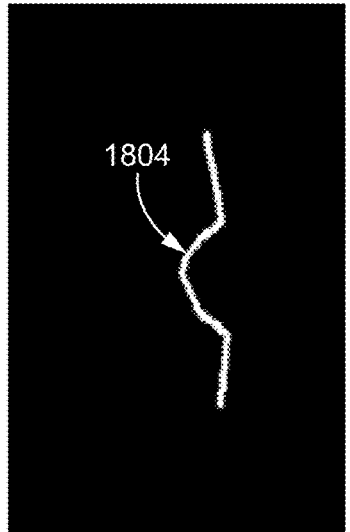
FIG. 18 shows the final contour image after noise removal operations in accordance with embodiments described herein.

Referring to FIGS. 16-18, a gap can be seen in the return from the combined pipe wall and sediment feature line. The image in FIG. 16 is the initial contoured image. The largest contour by pixel count is measured with a bounding box 1610 that shows it does not span between the water line mask. A single dilation operation creating a dilated bounding box 1620 is applied as described above, after which the second contour shown in FIG. 17 is found to have the proper span. The image 1802 in FIG. 18 is produced by averaging the x-positions of the pixels in the columns for each y-value row. The line 1804 is redrawn on a black background, without any noise. According to some embodiments, the sediment detection step after pipe-wall masking contains only sediment feature pixels, completely noise-free. Testing the same image set and lower thresholds shows more robust feature detection at lower thresholds than without the contour method noise removal approach.

Figure 19:
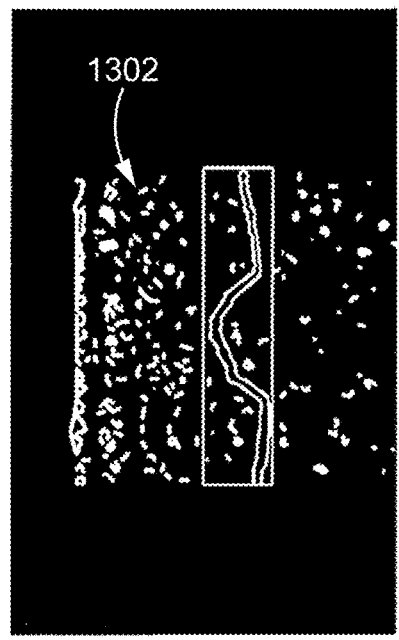
FIGS. 19 and 20 show the same image contoured with a threshold=6, which previously resulted in failed sediment detection in accordance with embodiments described herein.
Figure 20:

A threshold value of 10 was used in the image sequence shown in FIGS. 16-18. The threshold=10 was manually selected after reviewing a subset of the entire run of the image, as being the best value. FIGS. 19 and 20 show the same image of raw sonar data 1302 contoured with a threshold=6, which previously resulted in failed sediment detection. At this lower threshold there was no need for dilation, and the contour 2002 containing the feature pixels is noise-free despite the noisy background. This increase in tolerance for the threshold range makes it more likely that an entire inspection can be processed with no need for resetting the threshold by manual observation, and decreases the likelihood of errors in the feature detection.

To further improve this algorithm the contour moments are calculated for cases where the gap in the sediment cannot be filled by dilation. Sediment and pipe wall moments differ from moments of noise contours in that the ratio of the maximum axis to the minimum axis is large, while for noise features this ratio is closer to one. As shown in the figures, the minimum bounding rectangle may be used for the approximate calculation. According to embodiments described herein, the angles of the sediment contour segments may be computed from the rectangles, so that the intersection of unconnected sediment segments can be computed and extended to form an unbroken sediment surface.

Template Matching

Figure 21:
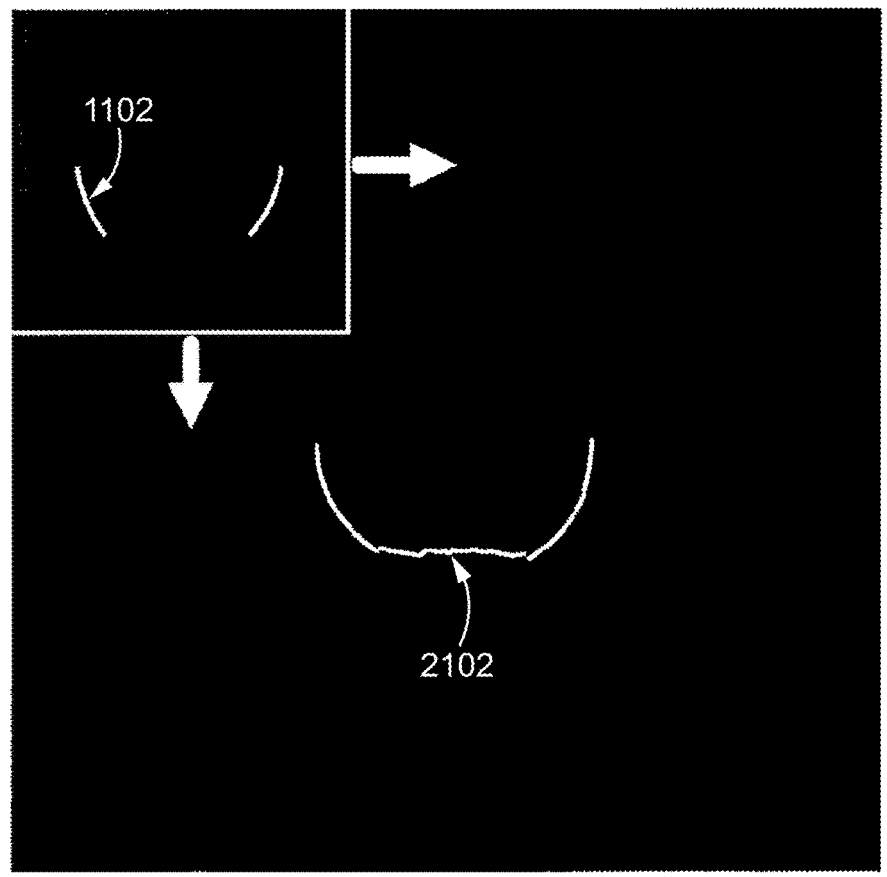
FIG. 21 illustrates the template of FIG. 11 being matched to the image of FIG. 10 to find the pipe circle center location in accordance with embodiments described herein.
Figure 23A:
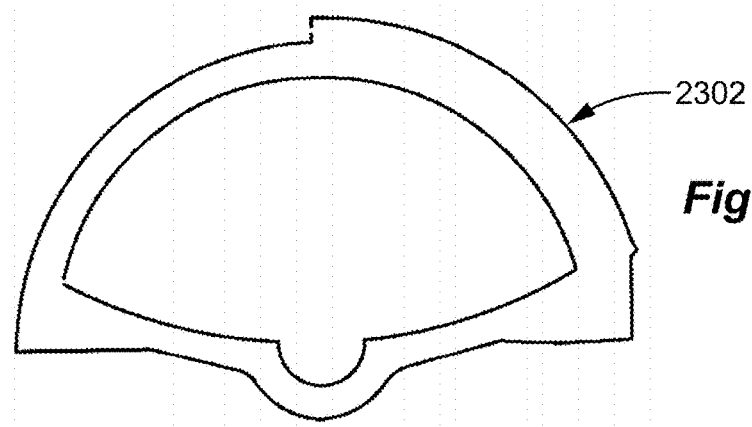
Figure 23B:
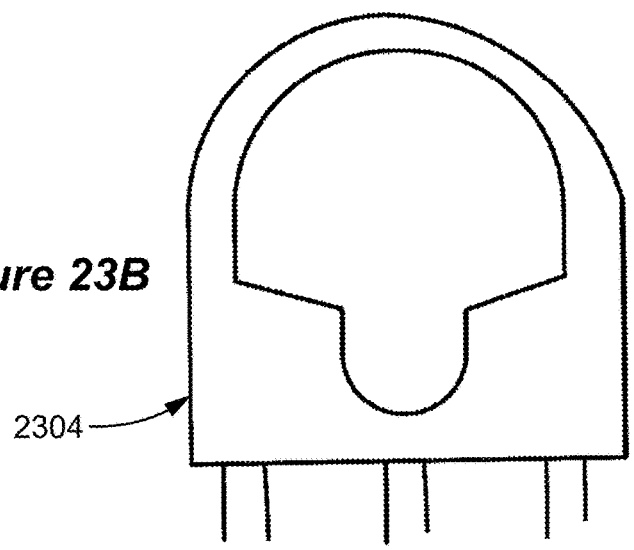
Figure 23C:
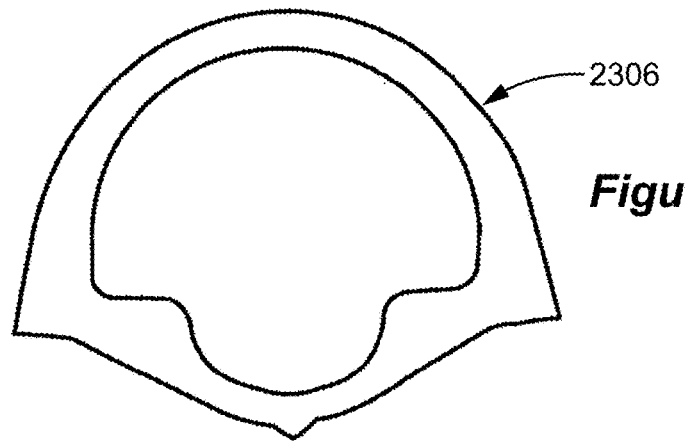
Figure 23D:
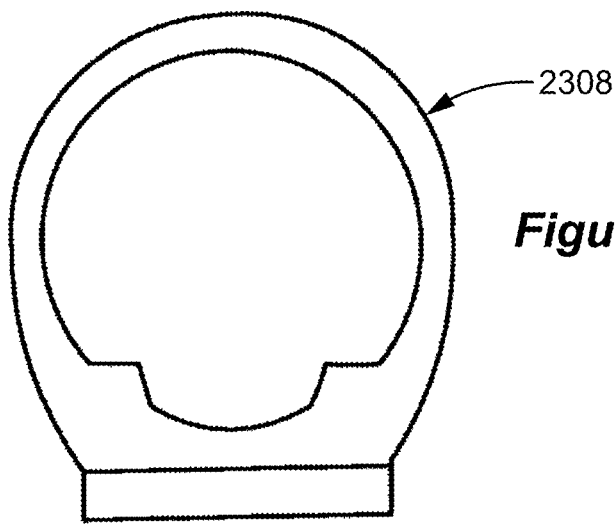
Figure 23E:
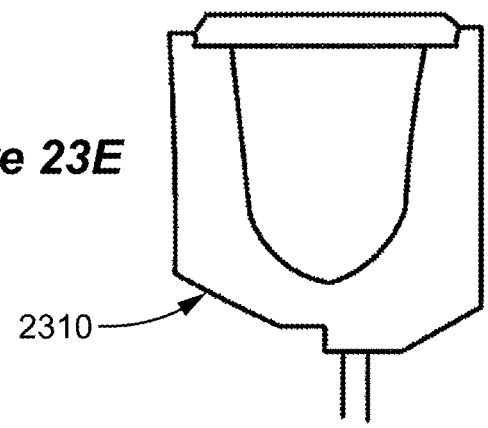
Figure 23F:
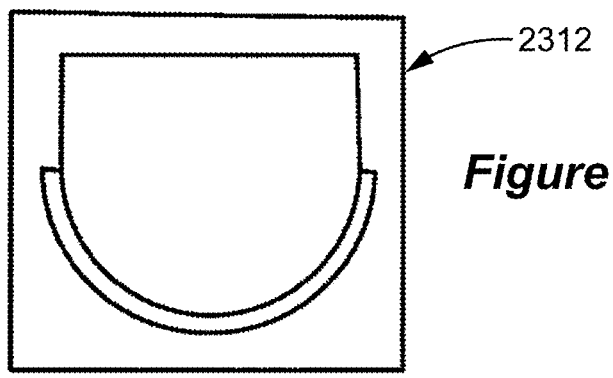

As is depicted in FIG. 21, the template 1102 of FIG. 11 is matched to the image of FIG. 10 to find the pipe circle center location. In practice, using a 500×500 template, the sonar image is centered in a 1500×1500 pixel 'canvas', so that all possible center locations are checked. In general, for an N×N sonar image, the canvas used is 3N×3N. The template matching algorithm will then give the correct location in terms of the original sonar image. The maximum point of the convolution between the template and the sonar image on the sonar canvas will yield the pipe cross-section 2102 center (including consideration for zero-indexing). One of the greatest advantages of the template-matching approach as opposed to Hough circle detection is that there are many other pipe shapes that are encountered in practice. FIG. 22 and FIGS. 23A-23F show examples of pipe shapes that may be encountered. FIG. 23A depicts exemplary pipe shape 2302, FIG. 23B depicts exemplary pipe shape 2304, FIG. 23C depicts exemplary pipe shape 2306, FIG. 23D depicts exemplary pipe shape 2308, FIG. 23E depicts exemplary pipe shape 2310, and FIG. 23F depicts exemplary pipe shape 2312. The pipe shape templates can be imported into the pre-processing software as bitmaps. For cases where sediment exists, the opposing partial templates can be computed for more accurate mapping.

Sediment Detection

According to embodiments described herein, the processor is configured to automatically calculate sediment depth and/or volume within the pipe. After the template matching process discussed above, the pipe wall cross section is located. A mask is constructed that blanks out the pipe wall circle and everything outside of it. Since there are commonly slight mismatches, due to imperfect pipe cross-sections or an imperfect template match, the mask radius is chosen to be slightly smaller than the pipe radius by a chosen amount, e.g., 3 pixels. Then, given that the noise removal step was effective, every non-zero pixel inside of the mask is taken as sediment. All non-zero points are ordered with by increasing x value. From the pixel with the smallest x-value at location $(x_p, y_r)$, the intersection with the circle $(x_i, y_i)$ is calculated as the horizontal line as shown in (4)

$$x_i = \min(x_c \pm \sqrt{y_c^2 - R_c^2 - 2y_p + y_p^2}) \qquad (4)$$

Here, $(x_c, y_c)$ is the circle center with circle radius $R_c$ and $y_i = y_p$, in image coordinates. This simply comes from the quadratic equation for the intersection of a circle and a line. The left-most intersection is calculated similarly.

The interior points on the sediment surface may simply be selected at various intervals, although there are often multiple points for a given image column, so that employing regression splines or at least piecewise linear regression lines provides a more accurate result. Even if the noise reduction is effective, there may be noise remnants that appear as extreme outliers in the spatial sediment distribution. Applying the Random Sample Consensus (RANSAC) method may eliminate the noise outliers.

Figure 24:
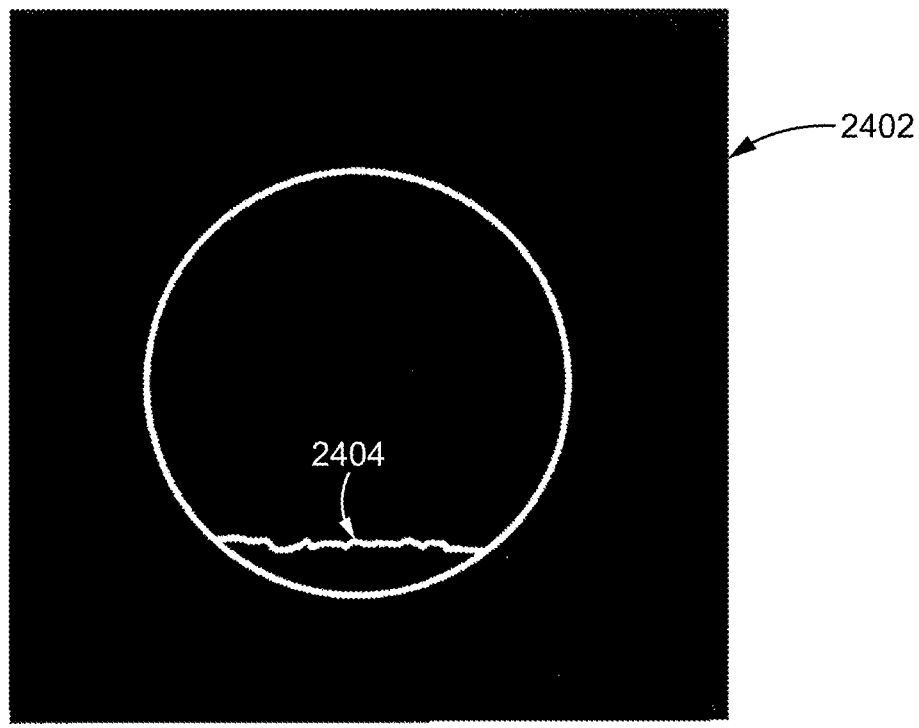
FIG. 24 shows an example of using polygonization for visualization of the sediment surface in accordance with embodiments described herein.
Figure 25:
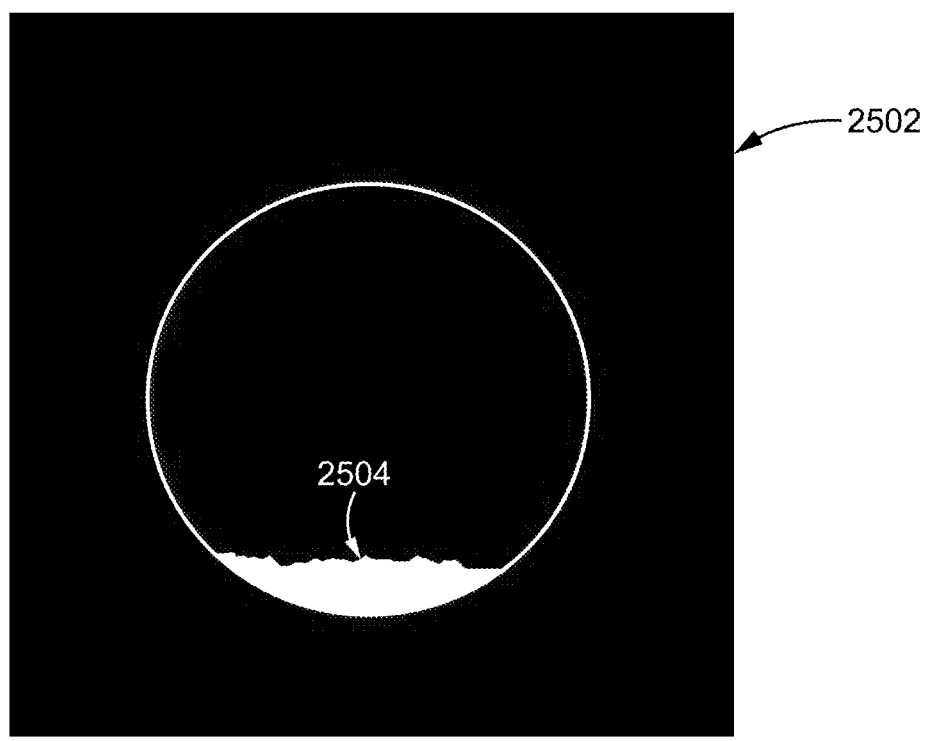
FIG. 25 illustrates using a pixel flood-fill between the sediment line and the pipe wall circle to calculate the area of the sediment in the pipe cross-section in accordance with embodiments described herein.

The output used by the Data analysis Visualization Command Center is a pre-specified number of points on the line that allow for polygonization for visualization of the sediment surface. An example result 2402 is shown in FIG. 24. After the top of the sediment 2404 is identified along with the circle intersections, the area of the sediment in the pipe cross-section is calculated using a pixel flood-fill between the sediment line and the pipe wall circle, as is shown in FIG. 25. The image 2502 shown in FIG. 25 has three channels, RGB, and the sediment area 2504 in pixels is calculated by counting the non-zero pixels in the green and blue channels. The pipe occlusion at the cross-section is the ratio of sediment pixels to the total number of pixels in the pipe cross-section circle, which are then converted to physical units.

The line representing the average area of sediment in the cross-section can be calculated from (5) derived from the root of the following circle chord equation and the Area A of sediment, with height above invert h.

$$R^2 \arccos\left(\frac{R-h}{R}\right) - \frac{R}{h}\sqrt{2Rh - h^2} - A = 0 \quad (5)$$

The root of the equation that yields h≤2R can be found by a number of different methods. In one implementation, the secant method with the starting values shown in (6) was found to always converge.

$$(h_0, h_1) = \pm R\sqrt{1 - \sin^2\left(\frac{A}{R^2}\right)} = \pm R\cos\left(\frac{A}{R^2}\right) \quad (6)$$

Given the area of the sediment at each cross-section I, and the associated payout, a good approximation to the total volume of sediment in the pipe is given by (7).

$$V = \sum_{i=0}^{N-1} \frac{A_{i+1} + A_i}{2}(P_{i+1} - P_i) \quad (7)$$

Pipe Deformation

One of the primary purposes of pipe inspection is gathering data on the pipe-profile using distance sensors including ring laser, LIDAR, ultrasonic devices, sonar, and/or combinations of such sensors. The inspection is to detect deformations that are manifested by non-circular pipe cross-sections, and/or other deformations for specialized pipe shapes. These defects may be due to corrosion and spalling, scouring, hard deposition, and/or pipe deformation due to loading or improper installation. Many states mandate laser inspection of newly-installed pipe and culvert systems. Prior to relining repairs, the minimum diameter of the pipe may be determined. In general, pipe deformations will have irregular cross-sections that are not easily represented by simple mathematical shapes.

Figure 26A:
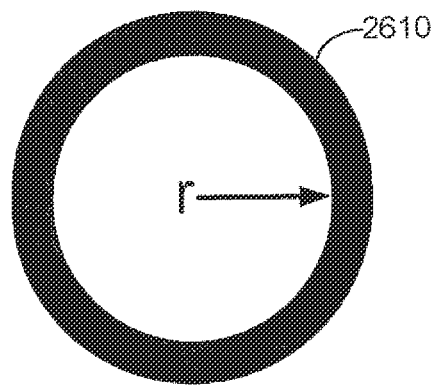
FIGS. 26A-26C show an example of pipe deformation due to vertical loading force in accordance with embodiments described herein.
Figure 26B:
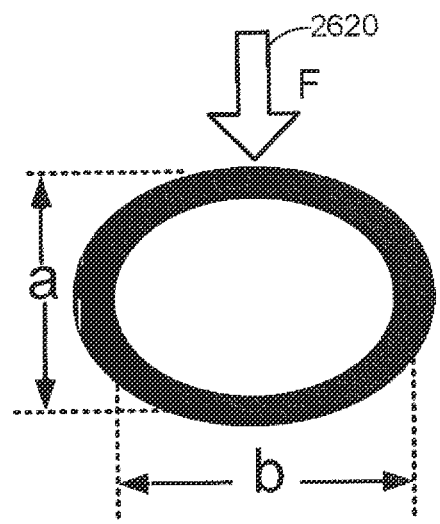
Figure 26C:
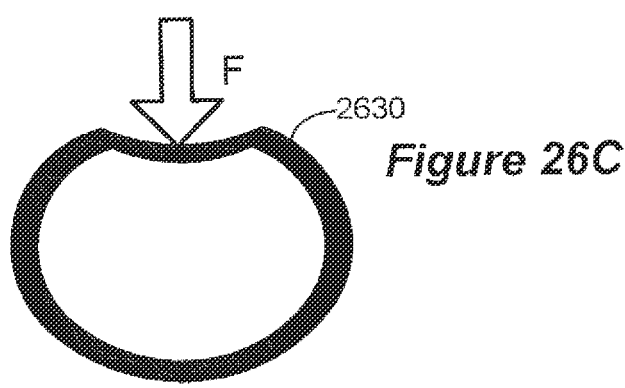

A simple example of pipe deformation due to vertical loading force is shown in FIGS. 26A-26C. FIG. 26A shows pipe having a radius r and a substantially circular cross-section. The pipe undergoes a vertical force 2620 causing deformation of the pipe and having the radius be non-uniform. FIG. 26C illustrates an example of a deformed pipe 2630 after undergoing the vertical force for a period of time. Referring to the above diagram center case, the most commonly used measure of pipe deformation is known as the percentage of ovality, defined in terms of the maximum pipe diameter $D_{max}$=a and the minimum diameter $D_{min}$=b, as illustrated above. The symmetric ovality is shown in (8).

$$\text{Ovality \%} = \times \left[\frac{D_{max} - D_{min}}{D_{max} + D_{min}}\right] \times 100 \quad (8)$$

Ovality is a simple metric, with assumed symmetric cross-section. There is value in more accurate measurement of pipe defects that can be used to accurately measure defects such as corrosion and spalling, scouring, and severe inelastic deformation as shown in right side of FIG. 26C, that may be a sign of impending pipe collapse.

In general, pipe deformations will have irregular cross-sections that are not easily represented by simple mathematical shapes. Various means are employed to measure these anomalies. The following description is a method for representing non-circular cross-sections of the type expected to be encountered in a pipe-profile inspection.

Figure 27:
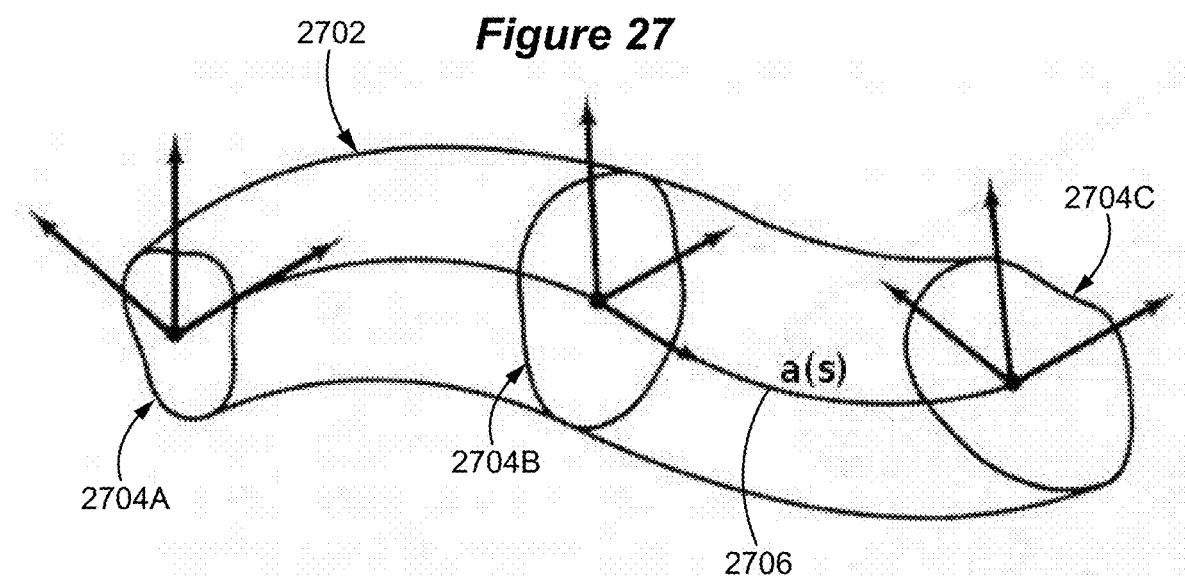
FIG. 27 shows a generalized cylinder made up of irregular and deformed cross-sections in accordance with embodiments described herein.

Referring to FIG. 27, consider the generalized cylinder 2702 made up of irregular and deformed cross-sections 2704A, 2704B, and 2704C. A parametrically-varying cross-section is swept along an arbitrary space curve 2706. The axis of the generalized cylinder 2702 may be represented parametrically as a function of the arc lengths as shown in (9).

$$a(s) = f(x(s), y(s), z(s)) \quad (9)$$

A local coordinate system is defined at each cross-section, and the data feature points are translated and rotated such that the axes are centered at the origin, with the major and minor axis aligned with the (x, y) axis in Cartesian coordinates. The cross-sections are generalized as the extended superellipse, defined in their local coordinate systems by (10) and (11).

$$\left(\frac{x^{f(\theta)}}{a_1}\right) + \left(\frac{y^{f(\theta)}}{a_2}\right) = 1 \quad (10)$$

$$\theta = \arctan 2\left(\frac{y}{x}\right) \quad (11)$$

Figure 28:
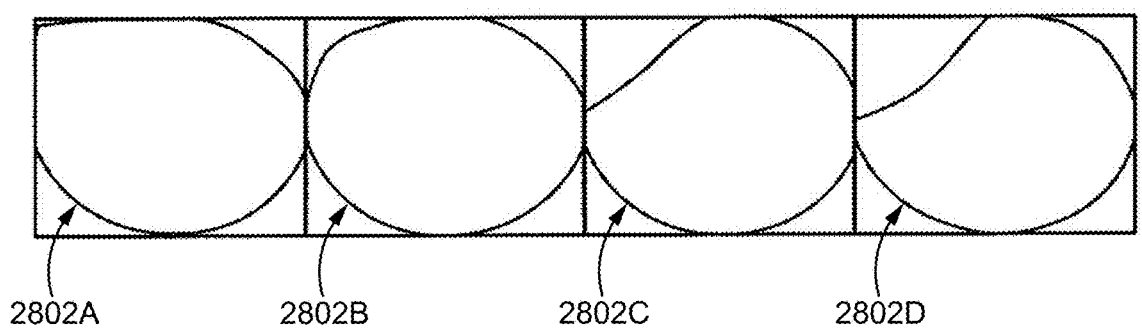
FIG. 28 illustrates examples of extended superellipse cross-sections in accordance with embodiments described herein.

In this case, arctan2 is the multi-valued inverse tangent. The function f(θ) may be defined continuously, or discontinuously, as needed to model deformities in the superellipse. Examples of extended superellipse cross-sections 2802A, 2802B, 2802C and 2802D are shown in FIG. 28.

In this approach, the function f(θ) is discretized in each quadrant as a set of $P_i$ control points equally spaced in θ using Bezier splines of degree n as shown in (12)

$$f(\theta_p) = \sum_{i=0}^{n} P_i \left(\frac{n!}{(n-i)!\,i!}\right)\left(\frac{\theta_{p_i} + \frac{\pi}{2}}{\pi}\right)\left(1 - \frac{\theta_{p_i} + \frac{\pi}{2}}{\pi}\right)^{n-i} \quad (12)$$

The Error of Fit function to be minimized is shown in (13).

$$EOF = \sum_{i=1}^{M} \left[1 - \left(\frac{x_i^{f(\theta_i)}}{a_1}\right) + \left(\frac{y_i^{f(\theta_i)}}{a_2}\right)\right]^2 \text{ for } M \text{ data points} \quad (13)$$

According to embodiments described herein, the Levenberg-Marquardt algorithm may be used to obtain the minimization.

Figure 29:
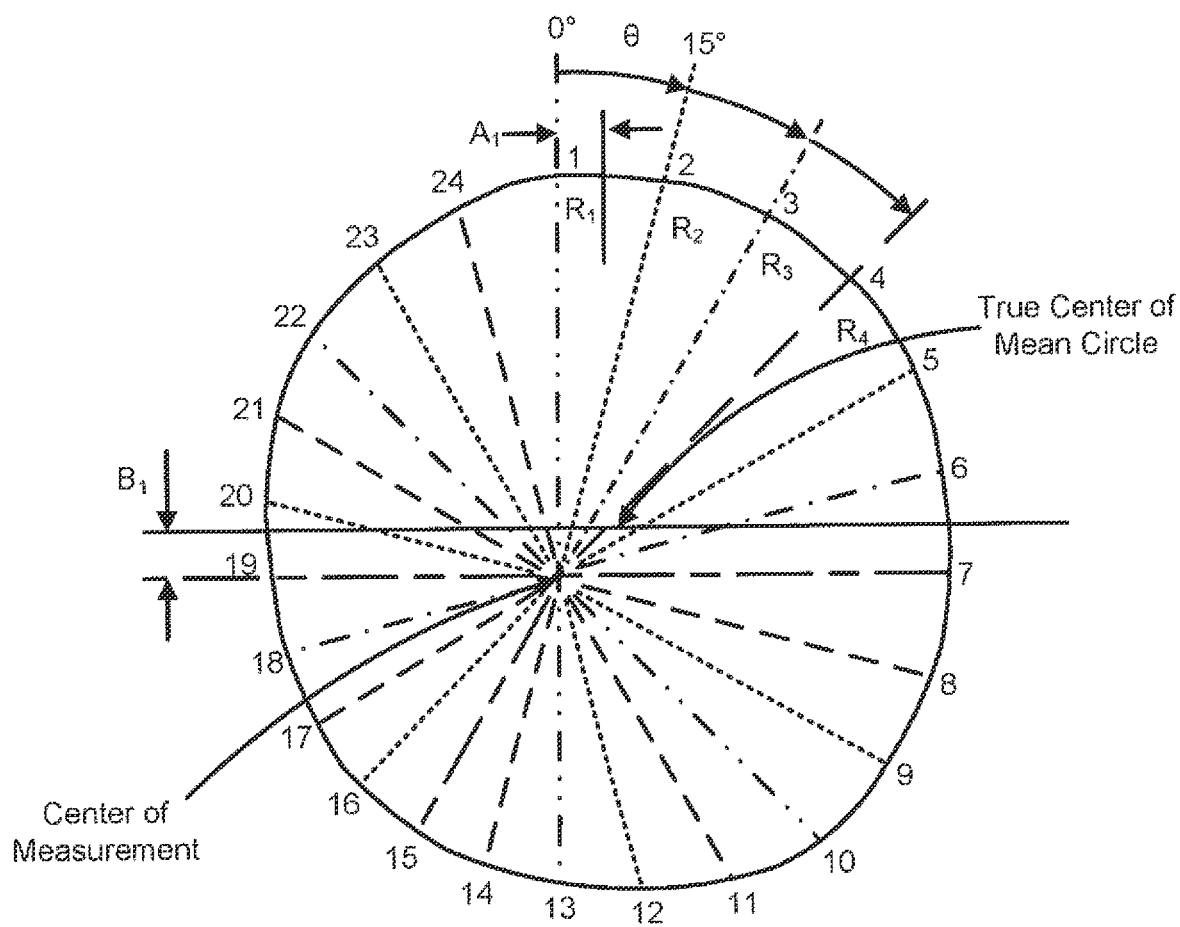
FIG. 29 shows using the out-of-roundness measurements to calculate an appropriate $f(\theta)$ for each profile in accordance with embodiments described herein.

One possibility is to use fitting of f(θ) for taking out-of-roundness statistics. According to embodiments described herein the out-of-roundness measurements, such as those shown in FIG. 29, are used to calculate an appropriate f(θ) for each profile.

If the pipe profile is symmetric, the equation of the extended superellipse shown above may reduce to the equation of a regular superellipse having the function f(θ)=2ε, where ε is a constant. In the case that the profile is a simple ellipse, the expression simplifies with f(θ)=2, where the constants $a_1$ and $a_2$ are the lengths of the semi-major and semi-minor axis. In the case of a circle, $a_1$=$a_2$=r, where r is the radius of the circle.

Data Quality Analysis Tool

Figure 30:
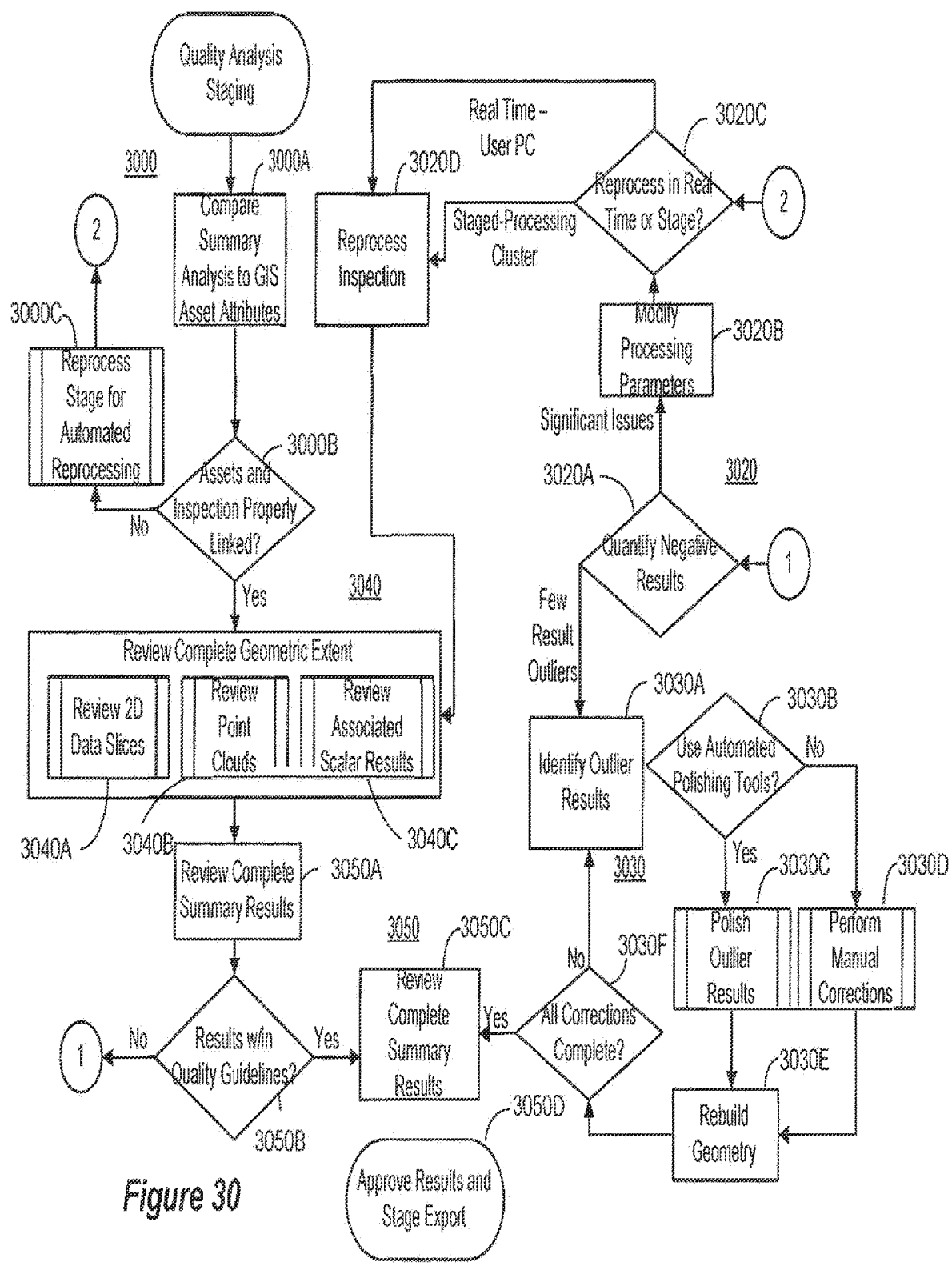
FIG. 30 is a flow chart of various processes performed by the Data Quality Analysis Tool in accordance with embodiments described herein.
Figure 31:
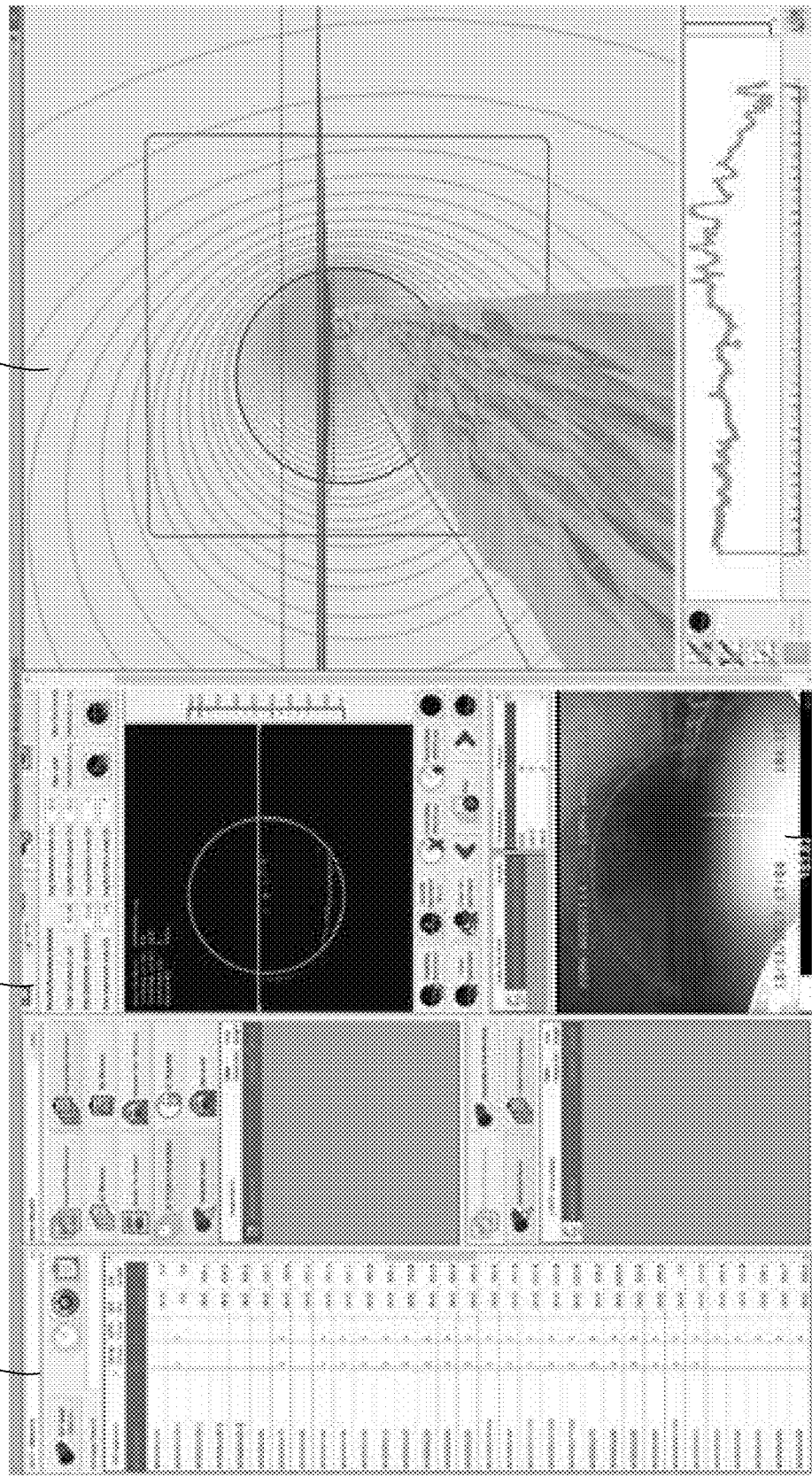
FIG. 31 shows an example of a Command Center graphical user interface (GUI) in accordance with embodiments described herein.

FIG. 30 is a flow chart of various processes performed by the Data Quality Analysis Tool 208 shown in FIG. 2. The Data Quality Analysis Tool 208 is an interactive software tool that provides the DA with a suite of tools for viewing the complete set of multi-sensor data for each inspection run in a project. The front-end to the Data Quality Analysis Tool 208 is referred to as the Command Center, the user interface, and or the GUI. An image of an example GUI is shown in FIG. 31. The example Command Center GUI of FIG. 31 shows views of the inspection and asset databases 3110, views on pre-processed sensor cross-sections 3120, a 3D view (e.g., a 3D fly-through view) derived from the pre-processor data 3130, a CCTV view 3140, and a variety of tools for both manual and automated editing.

An example of one of the interactive tools available for viewing is shown in FIGS. 32A-32D. This tool may referred to as the Multi-Context Interactive 2D Tool, which provides a view over the length of the pipe for values derived in the pre-processing step. FIG. 32A depicts a graph 3202A that shows the X-offset of the template, wherein the y-axis of graph 3202A corresponds to the X offset and the x-axis of graph 3202A corresponds to the length of the pipe. FIG. 32B depicts a graph 3202B that shows the Y-offset of the template, wherein the y-axis of graph 3202B corresponds to the Y offset and the x-axis of graph 3202B corresponds to the length of the pipe. FIG. 32C depicts a graph 3202C that illustrates the pipe location positions and sediment depth, wherein the y-axis of graph 3202C corresponds to the sediment depth and the x-axis of graph 3202C corresponds to the location of that sediment over the length of the pipe. FIG. 32D depicts a graph 3202D that shows delta Z measured from the cable payout, wherein the y-axis of graph 3202D corresponds to the delta Z and the x-axis of graph 3202D corresponds to the length of the cable payout.

Figure 33A:
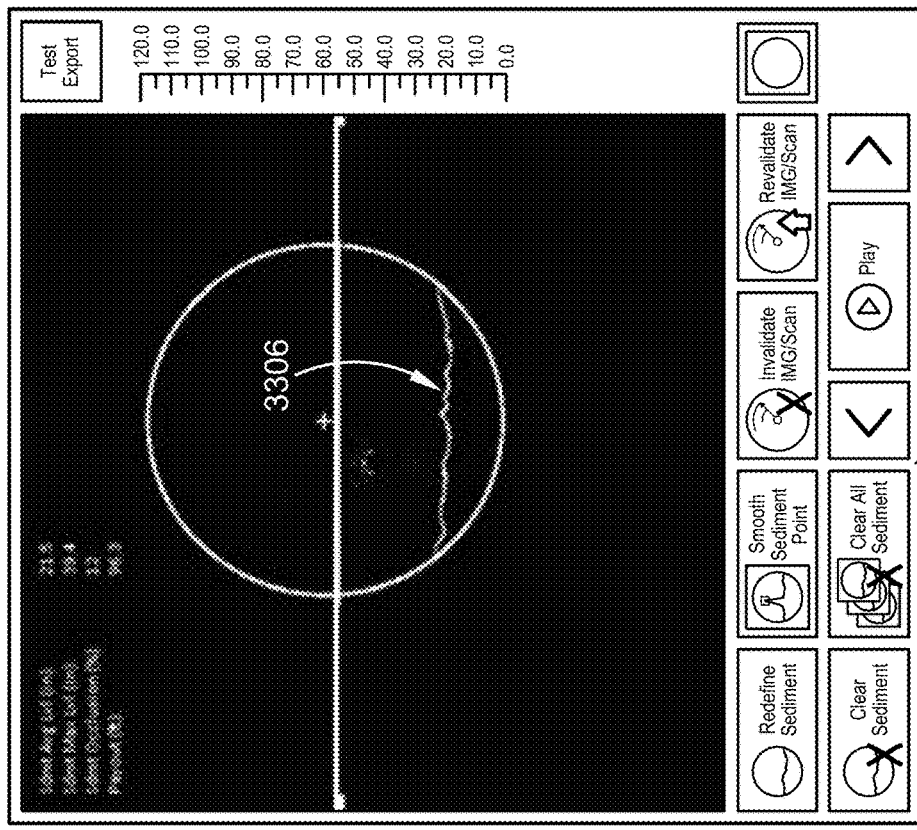
FIGS. 33A and 33B show a sediment editing tool configured to allow editing of sediment points in accordance with embodiments described herein.
Figure 33B:
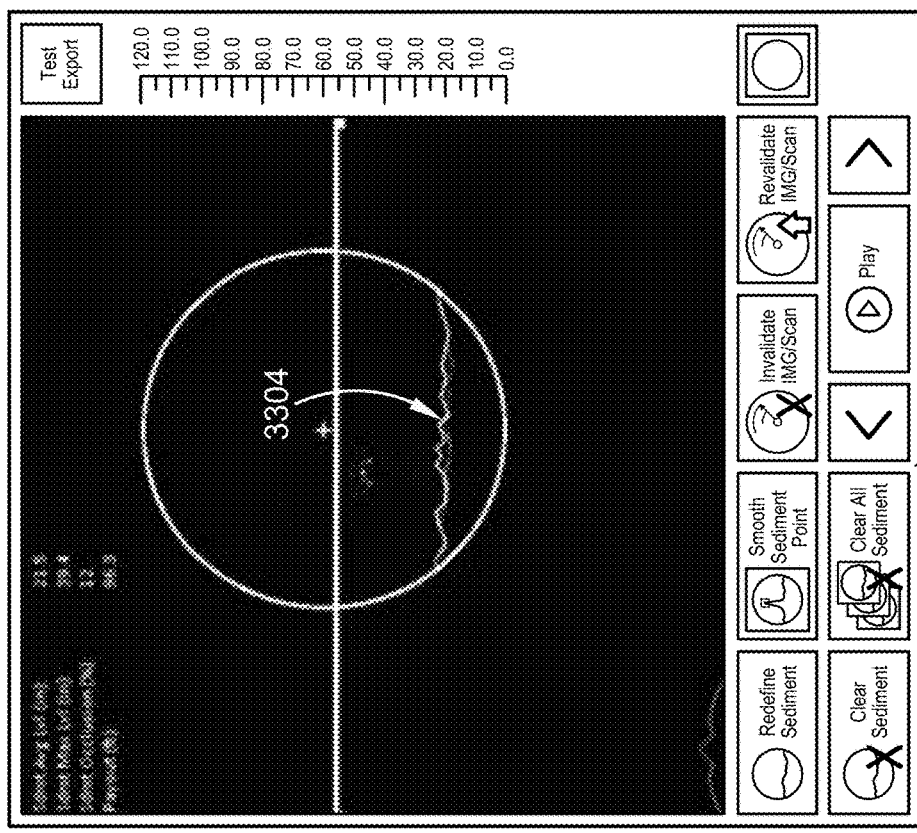
Figure 33C:
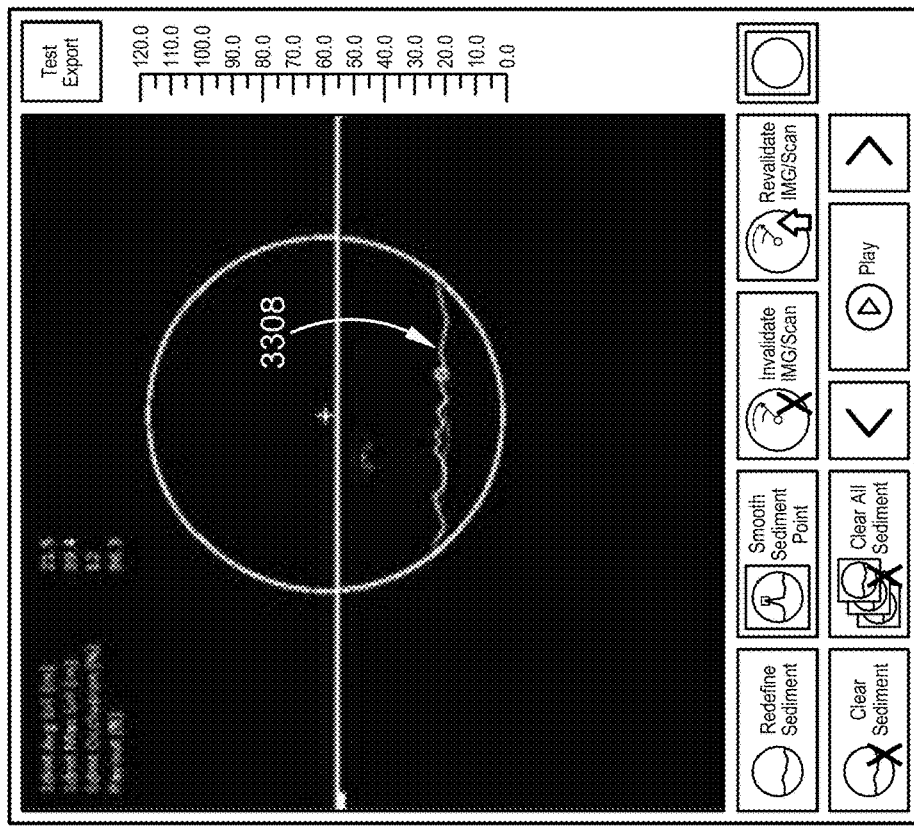
FIGS. 33C and 33D depict the interface for an automated tool used to eliminate sediment surface outliers due to noise in a sonar scan in accordance with embodiments described herein.
Figure 33D:
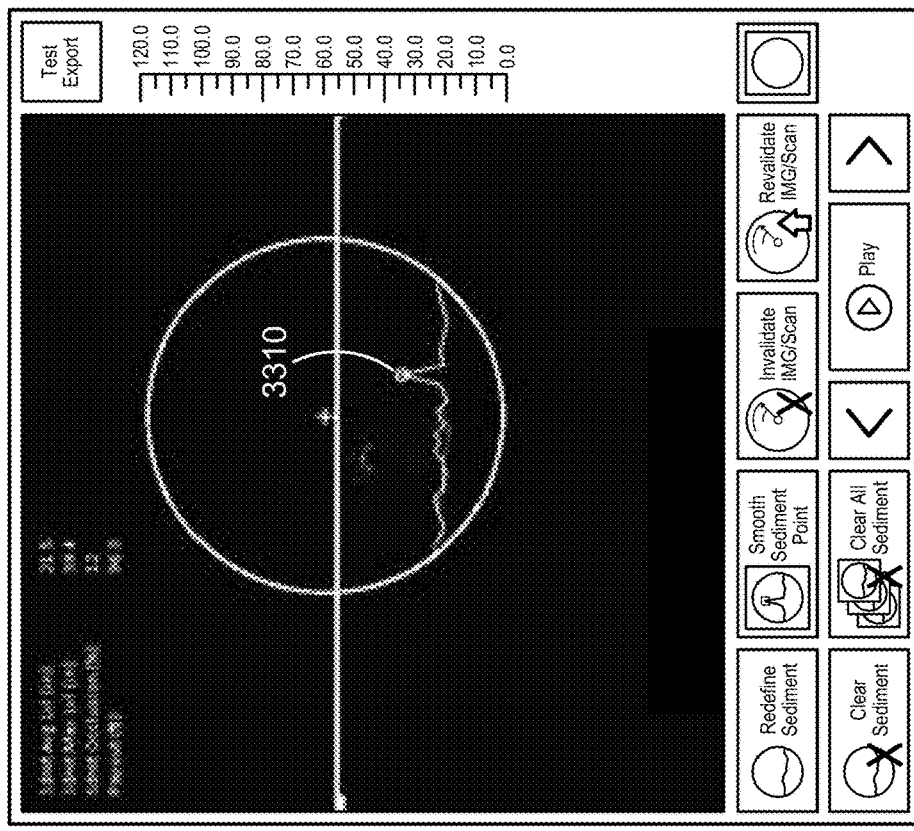

FIGS. 33A-33D show a sediment editing tool 3302 on the user interface that allows for editing of detected sediment points. Editing of sediment points may involve one or more of moving sediment points, smoothing sediment points, and deleting sediment points. In FIG. 33B, the sediment points 3304 from FIG. 33A have been redefined and moved as represented by smoothed line 3306. FIGS. 33C and 33D depict an example in which the sediment editing tool is used to eliminate sediment surface outliers due to noise in a sonar scan. A sediment surface outlier 3310 can be seen in FIG. 33C, which is eliminated using the tool, as is seen in FIG. 33D to result in a smoother line 3308 after the outlier 3310 was eliminated.

Referring again to FIG. 30, in the Quality Analysis Staging process step 3000, a view of the databases containing both the project GIS data and inspection pre-processed data stored in the normalized database is checked 3010A, 3010B for correct linkage in the database using the quality control module. If proper linkage is found, the inspection data is cleared for further manual inspection QC in step 3040. If proper linkage is not found, the data is marked for corrective action 3010C.

The DA is able to choose to reprocess a run with a non-default set of processing parameters either at the time (directly) or to insert an additional processing command into the cluster driven, staged process. If the DA chooses to reprocess the run with a non-default set of processing parameters either at the time, the reprocessed run may be run locally on the DA's PC. If the DA chooses to insert an additional processing command into the cluster driven, staged process, the reprocessing may be run on an array of commodity and/or purpose-built PCs that process data when it is received and/or when processing is requested.

If the inspection data is properly linked to the project GIS assets, the pre-processed multi-sensor inspection data is viewed by the DA (3020) to determine the degree of editing required. Negative results stemming from failures in machine vision algorithms due to excessive noise, possible equipment failure, turbulent flow and/or other causes lower the quality and accuracy of final output. Negative results are quantified at 3020A. In many cases the DA recognizes these errors based on unexpected discontinuities in the data. The negative results may also be detected by statistical methods measuring the spatial autocorrelation of the data, and/or other means.

Incorrect default parameters used in the pre-processor may cause a large number of errors. If this is the case, modification of processing parameters 3020B and/or additional pre-processing steps 3020C, 3020D may be performed. In some cases, the pre-processed multi-sensor inspection data is visually checked and any outliers are manually edited 3030 in accordance with the QC process.

At step 3030, outlier results are identified 3030A. The DA may identify outlier results by lack of discontinuities in the 3D view, or automatically jump to obvious discontinuous features using the 2D interactive views shown in FIGS. 32A-32D. Manual adjustments of pipe wall positions may be supplemented with an automatic adjustment of sediment when sediment is present. The sediment by also be adjusted by the DA where it is inaccurate, and false sediment detection may be automatically cleared.

If automated polishing tools 3030B are not used, manual corrections can be made 3030D by the DA. In some cases, a combination of automated polishing tools and manual corrections may be performed. After corrections have been made, pipe geometry is rebuilt 3030E to reflect the corrections. It is determined 3030F if the corrections are complete. It may be determined that the corrections are complete based on an automated process. In some cases, the DA determines and provides input to indicate the corrections are complete. If it is determined 3030F that further corrections are needed and/or desired, at least some of steps 3030A-3030F are repeated. When it is determined 3030F that the corrections are complete, the DA can review 3050C the complete summary results as a part of steps 3050. It may be determined 3050B whether the results are within quality guidelines. This may be determined automatically or based on DA input. If it is determined that the results are within established quality guidelines, the complete summary results may be reviewed 3050C and the results may be approved and exported 3050D. If it is determined 3050B that the results are not within quality guidelines, the negative results may be quantified 3020A.

As indicated in step 3040, the multi-sensor data is reviewed per scan in cross-section 3040A, as 3D point clouds 3040B, and in terms of scalar values 3040C derived from the pre-processor step. Sharp variations in the auto-correlation in this view indicate outliers that require closer inspection. The tool is interactive in that the user may select a point on the tool that will automatically translate the user view to the corresponding position on the pipe, where manual corrections may be made if required, followed by a review 3050A of complete summary results.

After all corrections are complete and all derived scalar values are calculated, a summary report can be generated 3050D according to customer specifications. For example, the summary report for a customer concerned about sedimentation loading in the pipe may comprise the following calculated values (with units) in the form of a CSV file for inclusion in a spreadsheet program: Distance into Pipe Start (ft.), Distance into Pipe End (ft.), Maximum Sediment Area (in$^2$), Sediment Volume (yd$^3$), and Maximum Water Level (in).

Figure 34:
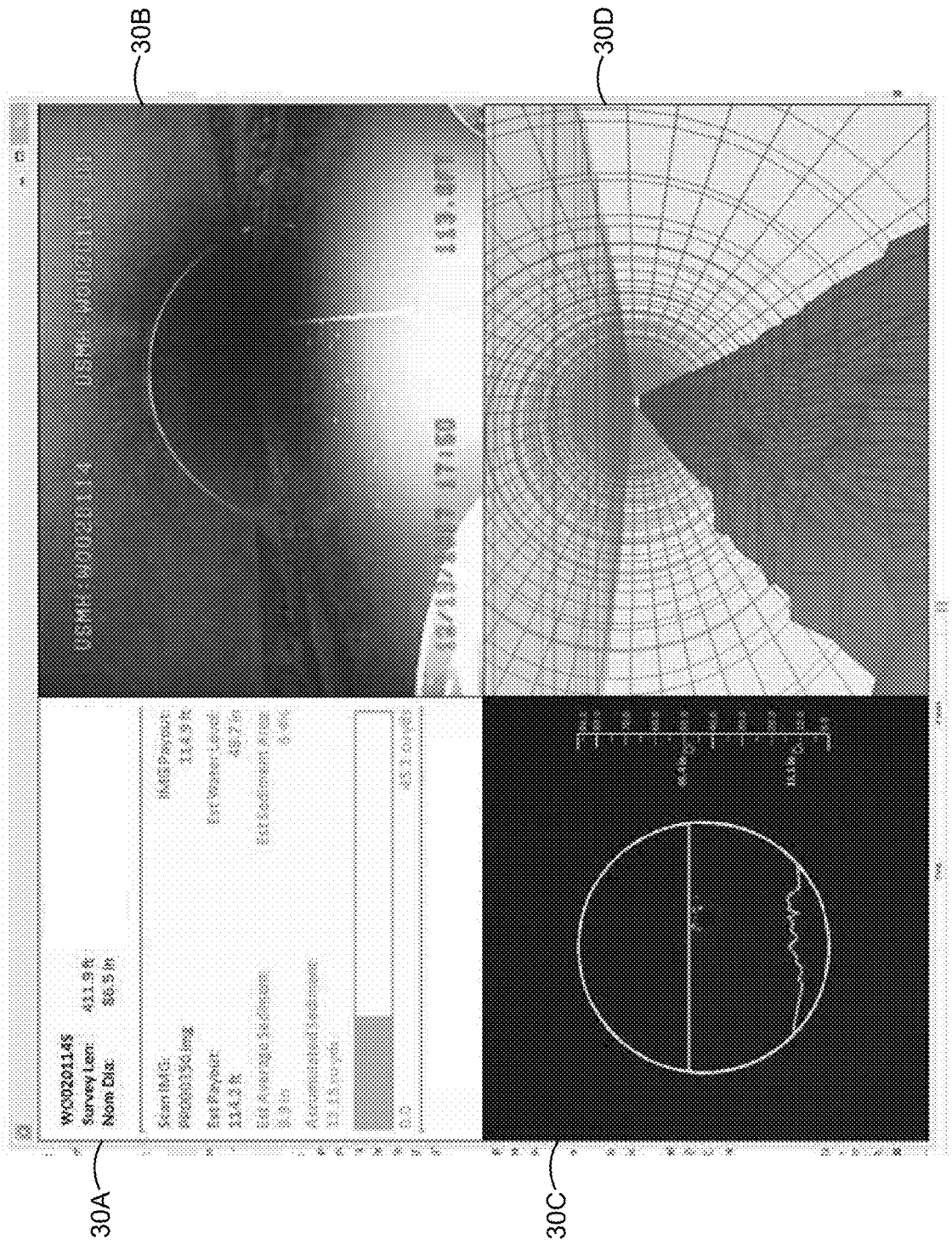
FIG. 34 shows an example of a quad view in accordance with embodiments described herein.

A unique feature of the Command Center shown in FIG. 31 is the Co-registered Quad View, shown in FIG. 34. Here, the focus is on video inspection above water combined with sonar inspection below water. The Quad View provides a registered view of both the raw sensor views along with calculated data values and calculated 3D geometry of the pipe features. This view serves as an integral part of the Command Center (see FIG. 31) for verification in the QC process, and also as a final product of interest to the customer.

An example image of the quad view shown in FIG. 34 includes a first quadrant 30A, which is a summary analysis with estimations. Information provided in the first quadrant 30A includes a Project ID, survey length, and nominal diameter of the pipe. Other information presented in the quad view is the IMG that shows the sonar data represented visually.

This tether supplies power and communications from the truck to the inspection sensor arrangement. With the length determined, the position encoder where the beginning zero length is at the point where the cable crosses the plane of the pipe entrance. Perfectly taut, the payout is a linear measure of the distance from the pipe entrance to the inspection Platform. The estimated payout is interpolated from the CCTV payout that is inscribed in the video. The referred visual representation, the IMG, gets its name because the value is stored in the sonar IMG files as metadata.

The information also includes estimated average sediment (in inches), accumulated sediment (in cubic yards), estimated sediment area (in percentage), and a moving bar graph of the accumulated sediment over the course of the survey length. A second quadrant 30B shows CCTV images at the current location within the pipe being viewed. A third quadrant 30C shows flat data that makes up the pipe reconstruction, with current readings of the flat data (e.g., water level and sediment level). The fourth quadrant 30D is a geometric 3D reconstruction of the pipe, with a subsurface view that is synchronized with the above-water view of the CCTV video in the third quadrant 30B. The fourth quadrant 30D provides a DA with a fly-through view of the pipe, allowing for the inspection of any location along the survey length. Data presented in the four quadrants 30A-30D is updated as the viewed location within the pipe changes.

In general, the views provided by the interface shown in FIG. 34 may be expanded to the number of sensors used in the inspection, either by further subdivisions providing more simultaneous views, or by providing switchable views of the raw sensor data. The co-registered view allows for user-controlled speed of translation through the pipe, including stop and reverse. Virtual pan, tilt and zoom can be provided in the case where the inspection is performed by a high-resolution digital camera with wide-angle lens providing complete visual coverage.

It is noted that some inspections involve full pipe runs, also referred to as siphon runs (i.e., gravity fed siphons). With full pipe runs, the pipe is completely or nearly completely filled with liquid. In such cases, a camera is not used, since there is little or no air void in the pipe. As such, the Co-registered Quad View for an inspection involving a full pipe run would exclude the CCTV view of the second quadrant 30B, but would include all other quadrant views.

Two Sensor Position and Yaw-Angle Correction for Arbitrary Shaped Pipe with Lateral Symmetry about the Y-Axis Radial profile sensors may have pitch and roll sensing, implemented with microelectromechanical (MEMS) components, for example. The radial profiling sensors can be used to measure pitch and roll error for each scan. Heading angle errors (yaw angle, azimuth angle) are usually relegated to 3-axis magnetometers, or combinations of magnetometers integrated into a MEMS Inertial Measurement Units (IMUs) employing some version of a Kalman filter. However, it is often the case in underground pipe networks that both hard and/or soft ferromagnetic material is used either as the pipe material or as reinforcement, so that real-earth headings are difficult to obtain. Further, it may be useful to know the sensor yaw angle and sensor position in terms of the local pipe central axis for the purpose of correcting the profile due to non-zero yaw angle and off-center measurements. When yaw angle and offsets are large, this series of corrections may be helpful for accurate evaluation of pipe deformations, pipe damage, and other abnormal features that are calculated as deviations of the measured and corrected pipe profile as compared to the nominal pipe template.

Using two profiling sensors, the sensor yaw angle and sensor position in terms of the local pipe central axis can be calculated as described below. This method works for any pipe shape that has lateral symmetry about the Y-axis. According to embodiments described herein, roll correction and pitch correction is performed first. In the remainder of this discussion roll angle and pitch angle are assumed to have been corrected to zero unless otherwise stated.

Figure 35:
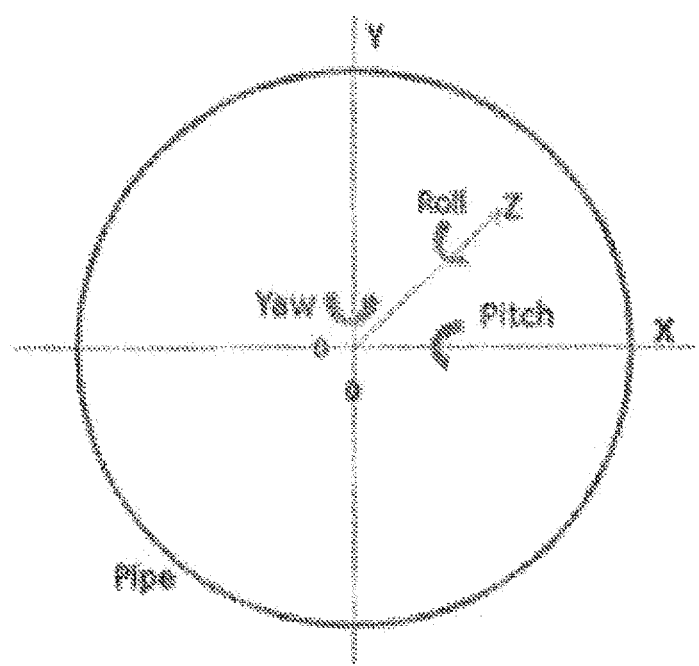
FIGS. 35 and 36 show different views of an example pipe in accordance with embodiments described herein.
Figure 36:
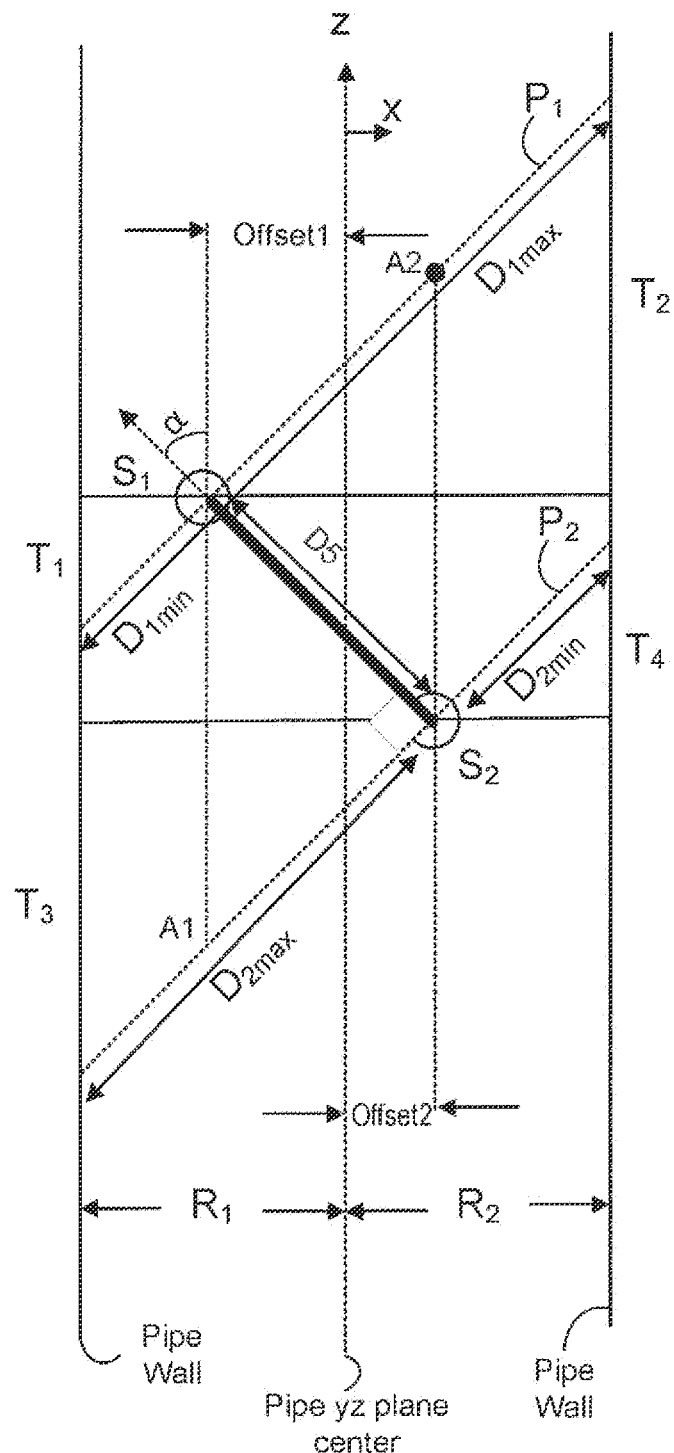

FIGS. 35 and 36 show different views of an example pipe in accordance with embodiments described herein. The distance between the pipe center axis and the pipe wall ($R_1$, $R_2$) is known. Two profiling sensors, $S_1$ and $S_2$, are disposed within the pipe. P1 and P2 represent the single-scan measurement planes for Sensor $S_1$ and Sensor $S_2$, respectively. For example, P1 is the plane that contains all measurements for $S_1$ for a given single sensor scan, under the assumption that the sensor arrangement motion is negligible during that scan. For each sensor, the maximum and minimum distance to the pipe wall is known as the minimum distance to the pipe walls in planes P1 and P2, respectively.

Since the profiling sensor rate is very fast compared to the sensor motion, to a good approximation the profiling sensor data for $S_1$ is in plane P1, while simultaneously the profiling data for sensor S2 is in plane P2, where P1 is parallel to P2.

In FIG. 36 $S_1$ and $S_2$ are the two profiling sensors, with measurements in their respective profiling planes $P_1$ and $P_2$, which are parallel to each other. For sensor $S_1$, the minimum $D_{1min}$, and maximum $D_{1max}$ distances to the pipe wall can be determined. A "positive return" is a sensor measurement value that is a non-null return from the target pipe wall (not a noisy return from debris or other sources of noise). For sensor $S_1$, the minimum $D_{1min}$, and maximum $D_{1max}$ are the minimum and maximum distances to the pipe wall for a single scan in plane P2, selected from the set of all positive returns from that scan. Similarly for sensor $S_2$, the minimum $D_{2min}$, and maximum $D_{2max}$ distances to the pipe wall can be determined.

The distance between sensors S1 and S2 is a known quantity: Ds. For the case that the yaw angles of the two sensors are the same, $\alpha 1 = \alpha 2 = \alpha$, then for each and every of the triangles T1, T2, T3 and T4 there will also be an angle, $\alpha$.

With the lateral symmetry condition R1=R2=R, which is equivalent to symmetry about the Y-Axis, for the case above and the triangles marked in above figure as shown in (14) and (15).

$$\Delta A_1 S_1 S_2 : \alpha = \tan^{-1}\left(\frac{D_{2max} - D_{1min}}{Ds}\right) \quad (14)$$

$$T1 : R - \text{Offset}_1 = D_{1min} \cos \alpha \quad (15)$$
$$T2 : R + \text{Offset}_1 = D_{1max} \cos \alpha$$
$$T3 : R + \text{Offset}_2 = D_{2max} \cos \alpha$$
$$T4 : R - \text{Offset}_2 = D_{2min} \cos \alpha$$

Here the unknowns are R and offsets 1, 2. We can add the equation for T1 and T2 to get (16).

$$R = \frac{(D_{1min} + D_{1max})}{2} \cos \alpha \quad (16)$$

Having solved for $\alpha$ and R we can use the above equations to solve for the offsets as shown in (17)

$$\text{Offset}_1 = R - D_{1min} \cos \alpha$$

$$\text{Offset}_2 = R - D_{2min} \cos \alpha \quad (17)$$

In general, the profile planes do not need to be perfectly parallel. According to embodiments described herein, the angle between the planes is known and constant. For example, there might be small errors in the mounting of the profiling sensors, in which the relative angles may be determined and the projection onto parallel planes could be considered a calibration step.

Given the yaw angle and the sensor offset, the profile of each sensor can be corrected by projecting the profile plane onto the plane perpendicular to the pipe wall passing through the respective sensor as shown in FIGS. 35 and 36.

Supplementary Mechanical and Electro-Mechanical Sensors

Figure 37:
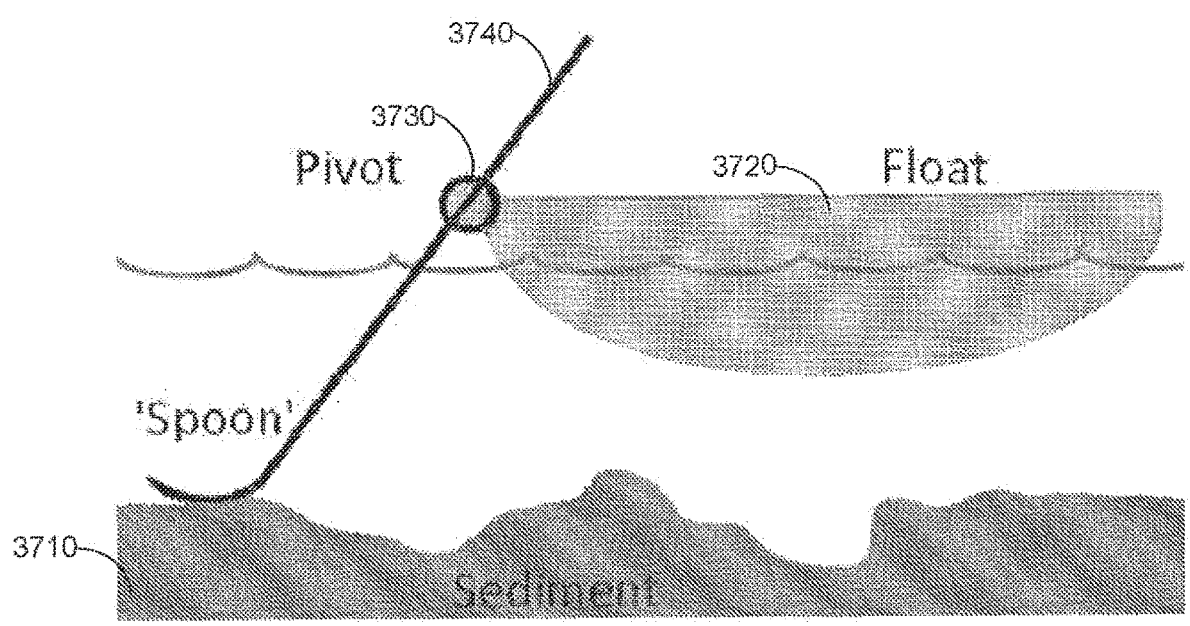
FIG. 37 shows a device that may be used to measure the sediment height from a sensor arrangement in accordance with embodiments described herein.

To supplement or validate sediment heights measured by other sensors, such as a sonar, the mechanical lever device, hereafter referred to as a "spoon" may be used to measure the sediment height from a sensor arrangement as shown in FIG. 37. The bottom of the spoon 3740 is configured to follow the sensor arrangement on top of the sediment 3710. According to various embodiments, there is a pivot point 3730 where the spoon 3740 is attached to the sensor arrangement 3740. In some cases, the pivot 3730 is loaded so that the distance from the top of the sensor arrangement to the top end of the spoon 3740 is inversely related to the sediment height, and could be calibrated to give absolute sediment height in length units of sediment depth.

According to embodiments described herein, the pivot 3730 contains a helical spring, with the force on the spring electro-mechanically measured to indicate the distance (depth) between the pivot 3730 and the pipe invert. The helical spring may allow the spoon 3740 to be lifted into a safe position if it is pulled back on the platform. For example, in cases in which the pipe is blocked and/or has collapsed, the spoon 3740 may be pulled back onto the platform to avoid damage to the spoon 3740.

According to embodiments described herein, the spoon 3740 not only provides a means to empirically measure the height of the water level above the invert of the pipe, as well as the fluctuation distance of the water line and bottom of the pipe as it moves laterally inside the pipe due to current effects, via electromechanical means, it is designed by shape and weight to 'ride' atop sediment 3710 in the pipe having sufficient cohesiveness (mass) as a quality control check against the data derived from sonar sensors.

Figure 38:
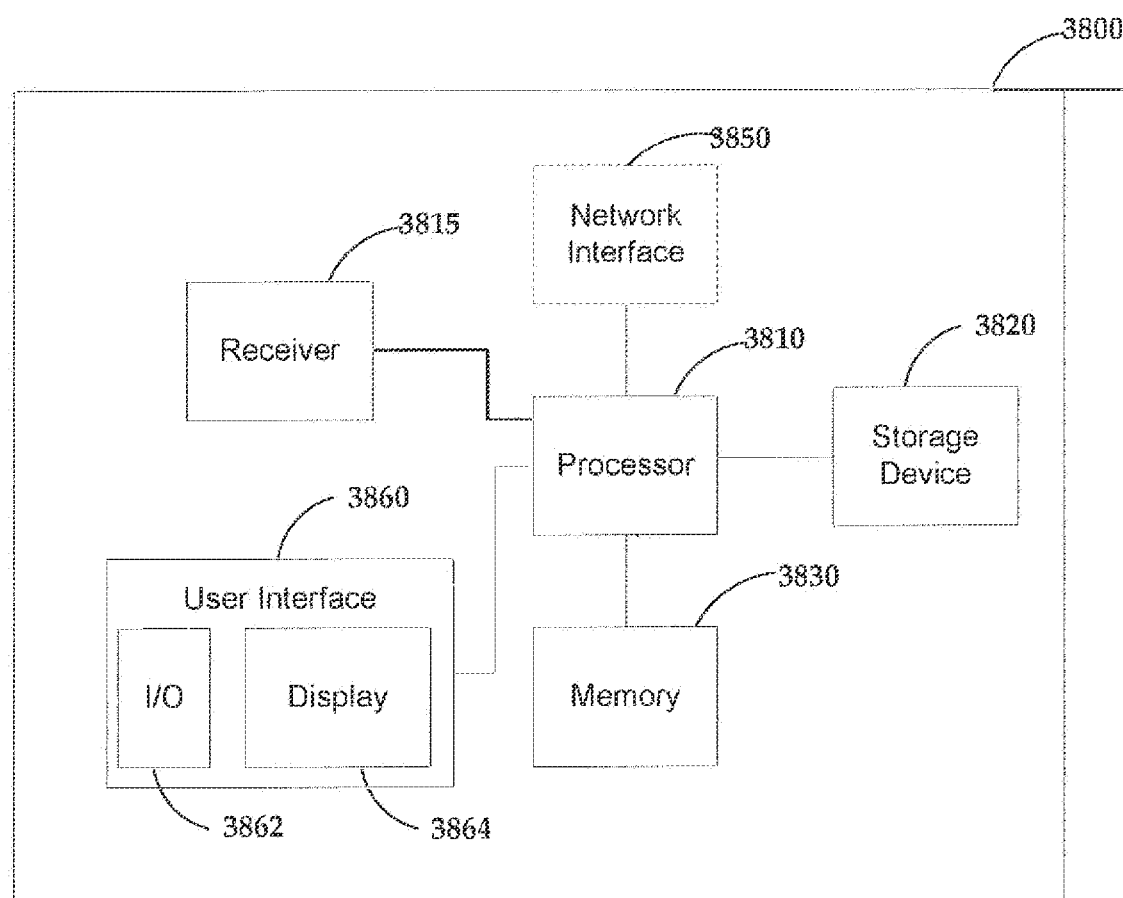
FIG. 38 illustrates a high-level block diagram of a computer that may be used to implement the processes described herein.

The above-described methods can be implemented on a computer using well-known computer processors, memory units, storage devices, computer software, and other components. A high-level block diagram of such a computer is illustrated in FIG. 38.

Computer 3800 contains a processor 3810, which controls the overall operation of the computer 3800 by executing computer program instructions which define such operation. The computer program instructions may be stored in a storage device 3820 (e.g., magnetic disk) and loaded into memory 3830 when execution of the computer program instructions is desired. Thus, the steps of the methods described herein may be defined by the computer program instructions stored in the memory 3830 and controlled by the processor 3810 executing the computer program instructions. The computer 3800 may include one or more network interfaces 3850 for communicating with other devices via a network. The computer 3800 also includes a user interface 3860 that enable user interaction with the computer 3800. The user interface 3860 may include I/O devices 3862 (e.g., keyboard, mouse, speakers, buttons, etc.) to allow the user to interact with the computer. Such input/output devices 3862 may be used in conjunction with a set of computer programs. The user interface also includes a display 3864 pipe information to the a user (e.g., a DA). The computer may also include a receiver 3815 configured to receive raw data from the one or more sensors and/or templates from the user interface 3860 or from the storage device 3820. According to various embodiments, FIG. 38. 38 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

The invention claimed is:

1. A system for collecting disparate data within a pipe, comprising:
   at least one sensor configured to be deployed within the pipe, wherein the at least one sensor generates data associated with at least one of structural and material defects of the pipe;
   a processor that executes instructions to process the data generated from the at least one sensor, wherein the instructions include:
     process preliminary data from the at least one sensor, wherein the instructions to process the preliminary data from the at least one sensor includes additional instructions to:
     apply a water-level mask by blanking above a water line;
     apply a bilateral filter to reduce noise in the data;
     implement a binarization threshold to the data filtered by the bilateral filter;
     extract contour features from the data generated from the at least one sensor;
     match some of the data to a template of the pipe;
     determine deformations in the pipe based on the data generated from the at least one sensor; and
     analyze quality of the data generated from the at least one sensor;
   wherein a corrective action is enabled to be performed at a defective location of the at least one of structural and material defects of the pipe, and wherein the defective location is determined based on the data processed by the processor.

2. The system of claim 1, wherein the instructions apply a bilateral filter to reduce noise in the data further includes the additional instructions to:
   establish a space domain of all possible positions in an image kernel;
   generate a spatial Gaussian kernel that is a weighted average of the intensity of pixels centered around a center pixel; and
   apply a multiplicative factor to preserves edges and blur noise.

3. The system of claim 1, wherein the instructions to extract contour features from the data generated from the at least one sensor further includes the additional instructions to:
   segment an image into regions based on perceptual similarity.

4. The system of claim 3, wherein the segmentation of the image into regions based on perceptual similarity is accomplished by instructions to:
   determine connected closed contours or chains of pixels that surround regions of similar pixels in the image, wherein closed contours are numbered sequentially, and create a hierarchy for holes in the image holes and for regions within the holes, recursively.

5. The system of claim 4, wherein the segmentation of the image into regions based on perceptual similarity is accomplished by instructions to:
   scan rows in the image; and
   scan regions in the image having like pixels in counter-clockwise manner.

6. The system of claim 3, wherein the segmentation of the image into regions based on perceptual similarity is accomplished by instructions to: define a bounding box around the largest span of connected closed contours or chains of pixels.

7. The system of claim 1, wherein the instructions to determine deformations in the pipe based on the data generated from the at least one sensor further includes the additional instructions to:
   determine a minimum diameter or interior dimension of the pipe.

8. The system of claim 1, wherein the instructions to analyze quality of the data generated from the at least one sensor further includes the additional instructions to:
   provide a view containing both GIS data and preprocessed data; and
   determine whether the GIS data and preprocessed data are linked, if proper linkage is determined, then inspection data is cleared for further manual inspection and if proper linkage is not found, then the data is marked for corrective action.

9. A system for collecting disparate data within a pipe, comprising:
   at least one sensor configured to be deployed within the pipe, wherein the at least one sensor generates data associated with at least one of structural and material defects of the pipe;
   a processor that executes instructions to process the data generated from the at least one sensor, wherein the instructions include:
     process the data from the at least one sensor;
     extract contour features from the data generated from the at least one sensor, wherein the instructions to extract contour features from the data generated from the at least one sensor includes additional instructions to segment an image into regions based on perceptual similarity, wherein the segmentation of the image into regions based on perceptual similarity is accomplished by instructions to define a bounding box around the largest span of connected closed contours or chains of pixels; compute angles of sediment contour segments; determine a presence of unconnected sediment segments; and extend any unconnected sediment segments to form an unbroken sediment surface;
     match some of the data to a template of the pipe;
     detect sediment depth or volume within the pipe based on the data generated from the at least one sensor;
     determine deformations in the pipe based on the data generated from the at least one sensor; and
     analyze quality of the data generated from the at least one sensor;
   wherein a corrective action is enabled to be performed at a defective location of the at least one of structural and material defects of the pipe, and wherein the defective location is determined based on the data processed by the processor.

10. A system for collecting disparate data within a pipe, comprising:

at least one sensor configured to be deployed within the pipe, wherein the at least one sensor generates data associated with at least one of structural and material defects of the pipe;

a processor that executes instructions to process the data generated from the at least one sensor, wherein the instructions include:

process the data from the at least one sensor;

extract contour features from the data generated from the at least one sensor;

match some of the data to a template of the pipe, wherein the instructions to match some of the data to the template of the pipe includes additional instructions to: determine a center of the pipe by centering an image in a pixel canvas, wherein for an N-pixel× N-pixel image, the pixel canvas used is 3N-pixel× 3N-pixel, and wherein N is any integer;

detect sediment depth or volume within the pipe based on the data generated from the at least one sensor;

determine deformations in the pipe based on the data generated from the at least one sensor; and analyze quality of the data generated from the at least one sensor;

wherein a corrective action is enabled to be performed at a defective location of the at least one of structural and material defects of the pipe, and wherein the defective location is determined based on the data processed by the processor.

11. A system for collecting disparate data within a pipe, comprising:

at least one sensor configured to be deployed within the pipe, wherein the at least one sensor generates data associated with at least one of structural and material defects of the pipe;

a processor that executes instructions to process the data generated from the at least one sensor, wherein the instructions include:

process the data from the at least one sensor;

extract contour features from the data generated from the at least one sensor;

match some of the data to a template of the pipe;

detect sediment depth or volume within the pipe based on the data generated from the at least one sensor, wherein the instructions to detect sediment depth or volume within the pipe based on the data generated from the at least one sensor includes additional instructions to: construct a mask to blank out everything outside of a pipe wall perimeter, wherein a mask radius smaller than a radius of the pipe radius, classify every non-zero pixel inside of the mask as sediment, calculate a horizon line of the sediment;

determine deformations in the pipe based on the data generated from the at least one sensor; and analyze quality of the data generated from the at least one sensor;

wherein a corrective action is enabled to be performed at a defective location of the at least one of structural and material defects of the pipe, and wherein the defective location is determined based on the data processed by the processor.

12. The system of claim 11, wherein the instructions to detect sediment depth or volume within the pipe based on the data generated from the at least one sensor further includes the additional instructions to:

select interior points of the sediment below the horizon line at various intervals; and employ at least one of (a) a regression spline and (b) a piecewise linear regression line.

13. The system of claim 12, wherein the instructions to detect sediment depth or volume within the pipe based on the data generated from the at least one sensor further includes the additional instructions to:

apply a Random Sample Consensus (RANSAC) to eliminate the noise outliers.

14. The system of claim 13, wherein the instructions to detect sediment depth or volume within the pipe based on the data generated from the at least one sensor further includes the additional instructions to:

create a visualization of a surface of the sediment via polgonization.

15. The system of claim 14, wherein the instructions to detect sediment depth or volume within the pipe based on the data generated from the at least one sensor further includes the additional instructions to:

calculate a surface area of the surface of the sediment via a pixel flood-fill between the horizon line of the sediment and the pipe wall perimeter.

* * * * *